US010349098B2

(12) United States Patent
Schmidt et al.

(10) Patent No.: US 10,349,098 B2
(45) Date of Patent: Jul. 9, 2019

(54) VIDEO AND DATA MULTIPLEXING IN AN ADAPTIVE BITRATE SERVER

(71) Applicant: ARRIS Enterprises LLC, Suwanee, GA (US)

(72) Inventors: Mark S. Schmidt, San Diego, CA (US); Praveen N. Moorthy, San Diego, CA (US); Ajay Luthra, San Diego, CA (US); Baozhou Li, San Diego, CA (US)

(73) Assignee: ARRIS Enterprises LLC, Suwanee, GA (US)

( * ) Notice: Subject to any disclaimer, the term of this patent is extended or adjusted under 35 U.S.C. 154(b) by 15 days.

(21) Appl. No.: 15/655,016

(22) Filed: Jul. 20, 2017

(65) Prior Publication Data
US 2018/0027266 A1   Jan. 25, 2018

Related U.S. Application Data

(60) Provisional application No. 62/364,382, filed on Jul. 20, 2016.

(51) Int. Cl.
H04N 21/236    (2011.01)
H04N 21/234    (2011.01)
H04N 21/24     (2011.01)
H04N 21/2662   (2011.01)
H04N 21/61     (2011.01)
H04N 19/134    (2014.01)

(52) U.S. Cl.
CPC ........ *H04N 21/236* (2013.01); *H04N 19/134* (2014.11); *H04N 21/23418* (2013.01); *H04N 21/2402* (2013.01); *H04N 21/2662* (2013.01); *H04N 21/6118* (2013.01)

(58) Field of Classification Search
None
See application file for complete search history.

(56) References Cited

U.S. PATENT DOCUMENTS

| 8,069,465 | B1 | 11/2011 | Bartholomay et al. |
| 2013/0179588 | A1 | 7/2013 | McCarthy et al. |
| 2016/0205164 | A1 | 7/2016 | Schmidt et al. |

FOREIGN PATENT DOCUMENTS

WO    2009/120782 A1    10/2009

OTHER PUBLICATIONS

PCT International Search Report & Written Opinion, Re: Application No. PCT/US2017/043082, dated Sep. 25, 2017.

*Primary Examiner* — Omar S Parra
(74) *Attorney, Agent, or Firm* — Thomas A. Ward

(57) ABSTRACT

A method is provided for multiplexing video services with data services in a constrained delivery pipeline. A soft upper bound for the video data bandwidth for a current schedule window $BW_{video}^{soft}(i)$ is generated, wherein the soft upper bound for the video data bandwidth such that an average video data bandwidth over a time period T is no greater than a hard upper bound for the video data bandwidth $BV_{video}$. The video data is then multiplexed with the other data according to the soft upper bound for the video data bandwidth $BW_{video}^{soft}(i)$.

14 Claims, 16 Drawing Sheets

VIDEO AND DATA MULTIPLEXING IN AN ADAPTIVE BITRATE SERVER

CROSS-REFERENCE TO RELATED APPLICATION

This application claims benefit of U.S. Provisional Patent Application No. 62/364,382, entitled "Video and Data Multiplexing in Adaptive Bitrate Server," by Mark Schmidt et. al, filed Jul. 20, 2016, which application is hereby incorporated by reference herein.

BACKGROUND

1. Field of the Invention

The present invention relates to systems and methods for transmitting data, and in particular to a system and method for multiplexing video services with data services in a constrained delivery pipeline.

2. Description of the Related Art

Managing video quality and bandwidth efficiency have always been critical with regard to the distribution of video data streams. Yet, today we are entering a new more complex era that will allow distribution of massive numbers of programs to consumers when, where, and how they choose. New technologies such as DOCSIS (Data over Cable Service Interface Specification) Version 3.1 and IP-based distribution protocols will make managing bandwidth to ensure a high quality of experience even more challenging.

Content aware adaptive streaming is a technique that enables the maximum use of network bandwidth by multiplexing video streams with variable bit rates in a channel with fixed bandwidth. U.S. Pat. No. 8,910,229, entitled "METHODS AND DEVICES FOR EFFICIENT ADAPTIVE BITRATE STREAMING," which is incorporated by reference herein, discloses such content aware adaptive streaming. Since the channel is capped to a fixed (hard) bandwidth, the total bandwidth of the video streams is likewise constrained to be fixed to the total bandwidth.

What is needed is a system and method for multiplexing video services with data services in a constrained delivery pipeline, (such as a DOCSIS service group) to maintain optimum video quality as video subscribers enter and leave the delivery pipeline. The present invention satisfies that need.

SUMMARY

To address the requirements described above, the following description discloses a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method of multiplexing video data having a video data bandwidth and other data. In one embodiment, the method includes generating a soft upper bound for the video data bandwidth for a current schedule window $BW_{video}^{soft}(i)$, the soft upper bound for the video data bandwidth $BW_{video}^{soft}(i)$ such that an average video data bandwidth over a time period T is no greater than a hard upper bound for the video data bandwidth $BV_{video}$; and multiplexing the video data and the other data according to the soft upper bound for the video data bandwidth $BW_{video}^{soft}(i)$. Other embodiments of this aspect include corresponding computer systems, apparatus, and computer programs recorded on one or more computer storage devices, each configured to perform the actions of the methods.

Implementations may include one or more of the following features.

The method where generating a soft upper bound for the video data bandwidth $BW_{video}^{soft}(i)$ includes: generating a required video data bandwidth $BW_{need}(i)$ for the current schedule window; generating an incremental change in video data bandwidth for the current schedule window $\Delta BW(i)$; and generating the soft upper bound for the video data bandwidth $BW_{video}^{soft}(i)$ from the required video data bandwidth for the current schedule window $BW_{need}(i)$ and the incremental change in the video data bandwidth for the current schedule window $\Delta BW(i)$.

The method where generating the incremental change in the video data bandwidth for the current schedule window $\Delta BWi$ includes: generating a difference between a target video data bandwidth $BV_{video}$ and a soft upper bound for the video data bandwidth for a previous schedule window $BW_{video}^{soft}(i-1)$; and scaling the difference between the target video data bandwidth $BV_{video}$ and the soft upper bound for the video data bandwidth for the previous schedule window $BW_{video}^{soft}(i-1)$; and generating the incremental change in the video data bandwidth $\Delta BWi$ from an incremental change in the video data bandwidth for a previous schedule window $\Delta BW(i-1)$ and the scaled difference between the target video data bandwidth $BV_{video}$ and the soft upper bound for the video data bandwidth for the video data bandwidth for the previous schedule window $BW_{video}^{soft}(i-1)$.

The method where generating the required video data bandwidth $BW_{need}(i)$ includes: generating a need parameter value for the current schedule window $NPV(i)$; generating the required video data bandwidth $BW_{need}(i)$ from the need parameter value for the current schedule window $NPV(i)$ and a quality factor $\alpha$.

The method where generating the required video data bandwidth $BW_{need}(i)$ from the need parameter value for the current schedule window $NPV(i)$ and a quality factor $\alpha$ includes: computing a normalizing function of the need parameter value for the current schedule window $f(NPV(i))$; and generating the required video data bandwidth $BW_{need}(i)$ from the computed normalizing function of the need parameter value for the current schedule window $f(NPV(i))$ and the quality factor $\alpha$.

The method where the need parameter value for the current schedule window $NPV(i)$ is computed at least in part according to at least one of: video complexity; a target device profile; and service priority level.

The method where scaling the difference between the target video data bandwidth $BV_{video}$ and the soft upper bound for the video data bandwidth for the previous schedule window $BW_{video}^{soft}(i-1)$ includes: loop filtering the difference between the target video data bandwidth $BV_{video}$ and the soft upper bound for the video data bandwidth for the previous schedule window $BW_{video}^{soft}(i-1)$; and modulating the loop filtered difference between the target video data bandwidth $BV_{video}$ and the soft upper bound for the video data bandwidth for the previous schedule window $BW_{video}^{soft}(i-1)$. Implementations of the described techniques may include hardware, a method or process, or computer software on a computer-accessible medium.

One general aspect includes an apparatus for multiplexing video data having a video data bandwidth and other data, including: a processor; a memory, communicatively coupled to the processor, the memory storing processor instructions including instructions for: generating a soft upper bound for the video data bandwidth for a current schedule window $BW_{video}^{soft}(i)$, the soft upper bound for the video data bandwidth such that an average video data bandwidth over a time period T is no greater than a hard upper bound for the video data bandwidth $BV_{video}$, and multiplexing the video data and the other data according to the soft upper bound for the video data bandwidth $BW_{video}^{soft}(i)$. Other embodiments of this aspect include corresponding computer systems, apparatus, and computer programs recorded on one or more computer storage devices, each configured to perform the actions of the methods.

Implementations may include one or more of the following features. The apparatus where the instructions for generating a soft upper bound for the video data bandwidth $BW_{video}^{soft}(i)$ include instructions for: generating a required video data bandwidth $BW_{need}(i)$ for the current schedule window; generating an incremental change in video data bandwidth for the current schedule window $\Delta BW(i)$; generating the soft upper bound for the video data bandwidth $BW_{video}^{soft}(i)$ from the required video data bandwidth for the current schedule window $BW_{need}(i)$ and the incremental change in the video data bandwidth for the current schedule window $\Delta BW(i)$.

The apparatus where the instructions for generating the incremental change in the video data bandwidth for the current schedule window $\Delta BW(i)$ include instructions for: generating a difference between a target video data bandwidth $BV_{video}$ and a soft upper bound for the video data bandwidth for a previous schedule window $BW_{video}^{soft}(i-1)$; and scaling the difference between the target video data bandwidth BWvideo and the soft upper bound for the video data bandwidth for the previous schedule window $BW_{video}^{soft}(i-1)$; and generating the incremental change in the video data bandwidth $\Delta BW(i)$ from an incremental change in the video data bandwidth for a previous schedule window $\Delta BW(i-1)$ and the scaled difference between the target video data bandwidth $BV_{video}$ and the soft upper bound for the video data bandwidth for the video data bandwidth for the previous schedule window $BW_{video}^{soft}(i-1)$.

The apparatus where the instructions for generating the required video data bandwidth $BW_{need}(i)$ include instructions for: generating a need parameter value for the current schedule window NPV(i); generating the required video data bandwidth $BW_{need}(i)$ from the need parameter value for the current schedule window NPV(i) and a quality factor $\alpha$.

The apparatus where the instructions for generating the required video data bandwidth $BW_{need}(i)$ from the need parameter value for the current schedule window NPV(i) and a quality factor $\alpha$ include instructions for: computing a normalizing function of the need parameter value for the current schedule window $f(NPV(i))$; and generating the required video data bandwidth $BW_{need}(i)$ from the computed normalizing function of the need parameter value for the current schedule window $f(NPV(i))$ and the quality factor $\alpha$.

The apparatus where the need parameter value for the current schedule window NPV(i) is computed at least in part according to at least one of: video complexity; a target device profile; and service priority level. Implementations of the described techniques may include hardware, a method or process, or computer software on a computer-accessible medium.

One general aspect includes an apparatus for method of multiplexing video data having a video data bandwidth and other data, including: a processor, the processor for generating a soft upper bound for the video data bandwidth for a current schedule window $BW_{video}^{soft}(i)$, the soft upper bound for the video data bandwidth such that an average video data bandwidth over a time period t is no greater than a hard upper bound for the video data bandwidth BVvideo; and a multiplexor for multiplexing the video data and the other data according to the soft upper bound for the video data bandwidth $BW_{video}^{soft}(i)$. Other embodiments of this aspect include corresponding computer systems, apparatus, and computer programs recorded on one or more computer storage devices, each configured to perform the actions of the methods.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and which is shown, by way of illustration, several embodiments of the present invention. It is understood that other embodiments may be utilized and structural changes may be made without departing from the scope of the present invention.

Multiplexing Video and Data

Figure 1:
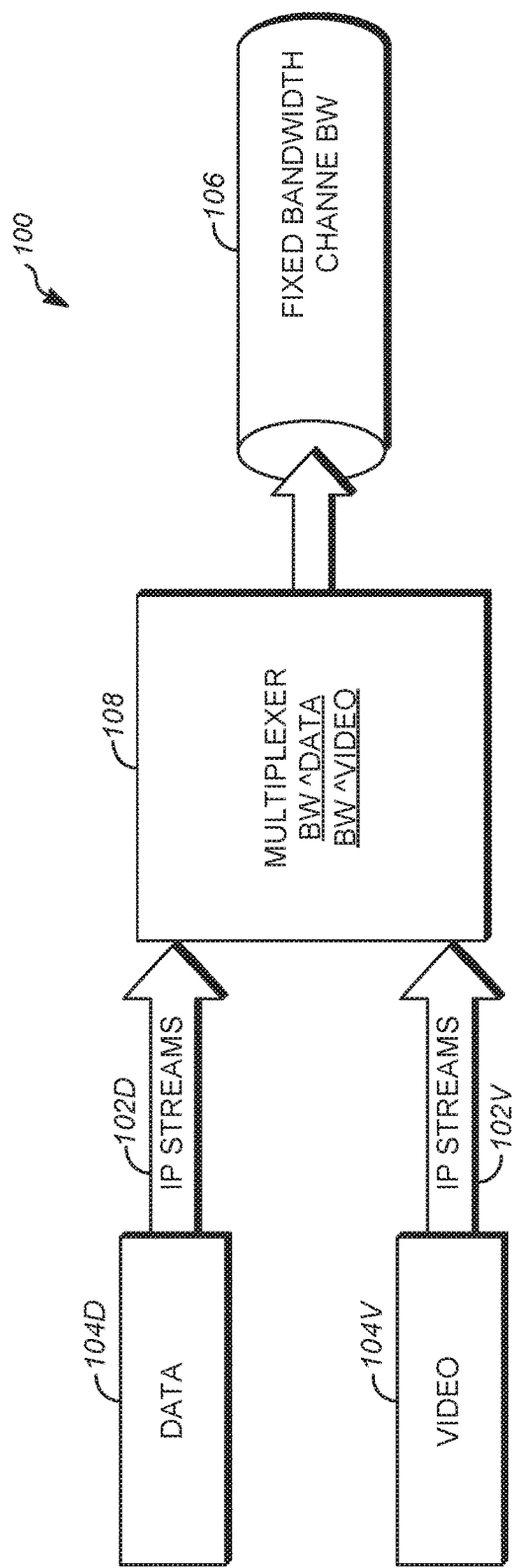
FIG. 1 is a diagram illustrating one embodiment of a content aware adaptive streaming system for multiplexing information.

Video services delivered to clients over internet protocol (IP) may be combined with other data services such as web browsing, file download, and voice over IP (VoIP) in the same fixed bandwidth channel. FIG. 1 is a diagram illustrating one embodiment of a content aware adaptive streaming (CASS) system 100 for multiplexing information. The system 100 comprises a multiplexer 108 that multiplexes information 102 comprising a video IP stream 102V from a video source 104V and a data IP stream 102D from a data source 104D for transmission on a communications channel 106 having a fixed bandwidth BW.

The communication channel 106 may be configured with target video bandwidth $BW_{video}$ and target data bandwidth $BW_{data}$ such that the sum of the bandwidth required for the data and the bandwidth for the video is equal to the fixed bandwidth capacity of the communications channel 106 as described in Equation (2-1):

$$BW_{data} + BW_{video} = BW \qquad \text{Equation ((2-1)}$$

In some CASS systems 100, the portion of the communications channel bandwidth BW ($BW_{video}$) is limited to a time-invariant constant value. This paradigm is problematic, however, because it either (1) reduces video quality (by coding the video at a constant bit rate (CBR) to assure the video contribution near but less than the bandwidth allocated to the video stream or video stream or (2) reduces efficiency (by coding the video at a variable bit rate, but requiring that the peak bit rate is less than the bandwidth allocated to the video stream, thus having unused capacity should the bit rate of the data be much less than $BW_{data}$.

This problem can be ameliorated by multiplexing the video and data using a soft bandwidth upper-bound, denoted as $BW_{video}^{soft}$, rather than hard bandwidth upper bound $BW_{video}$. In this case, the soft bandwidth upper bond $BW_{video}^{soft}$ can be higher or lower than the hard bandwidth upper bound $BW_{video}$, so long as it satisfies Equation (2-2) over a period of time T:

$$\int_0^T BW_{video}^{soft}(t)dt \approx BW_{video} \times T \qquad \text{Equation (2-2)}$$

Figure 2:
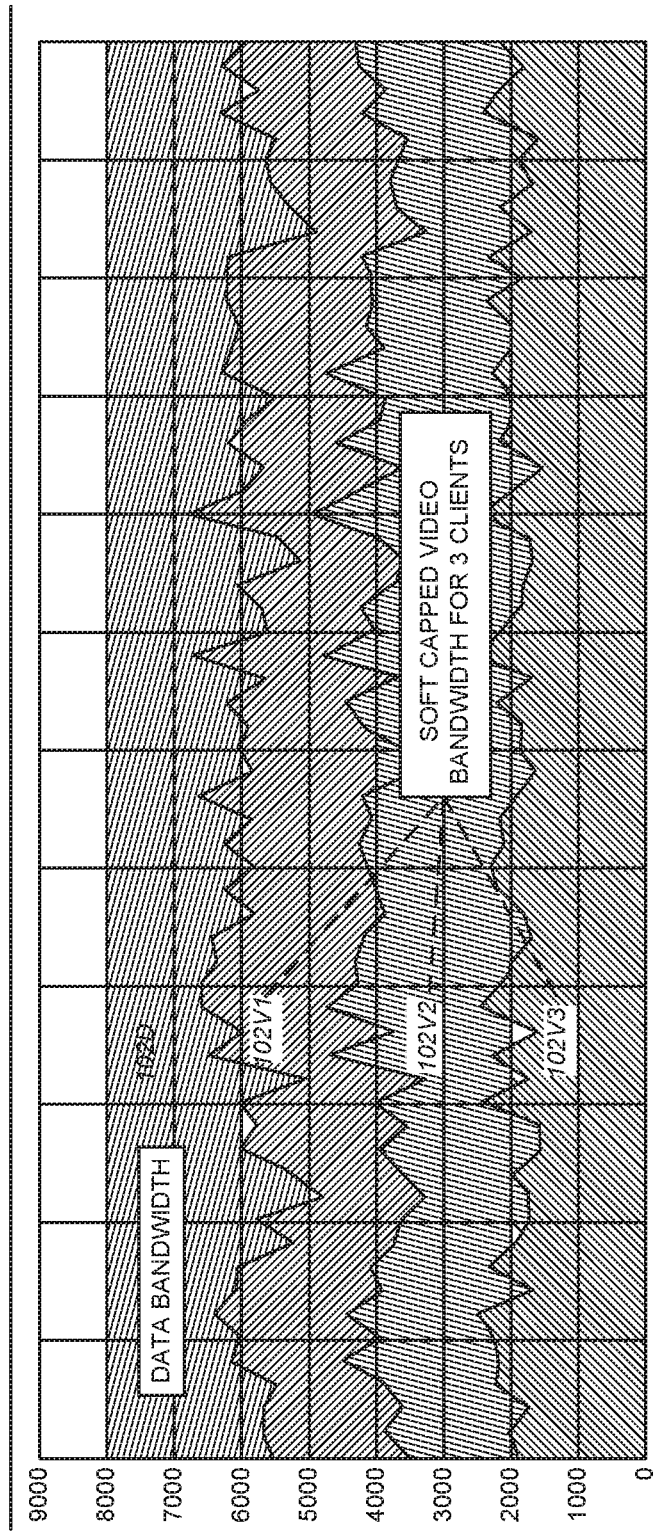
FIG. 2 is a diagram illustrating an example of multiplexing three video data streams and a data stream.

FIG. 2. is a diagram illustrating an example of multiplexing three video data streams 102V1, 102V2, and 102V3 and a data stream 102D, showing the usage of network bandwidth by each stream. In this example, the bandwidth consumed by the video data streams 102V (e.g. video bandwidth of the three streams) is permitted to exceed or fall short of the allocated or target video bandwidth $BW_{video}$ of 6000 Kbps, while still complying with Equation (2-2).

Figure 3:
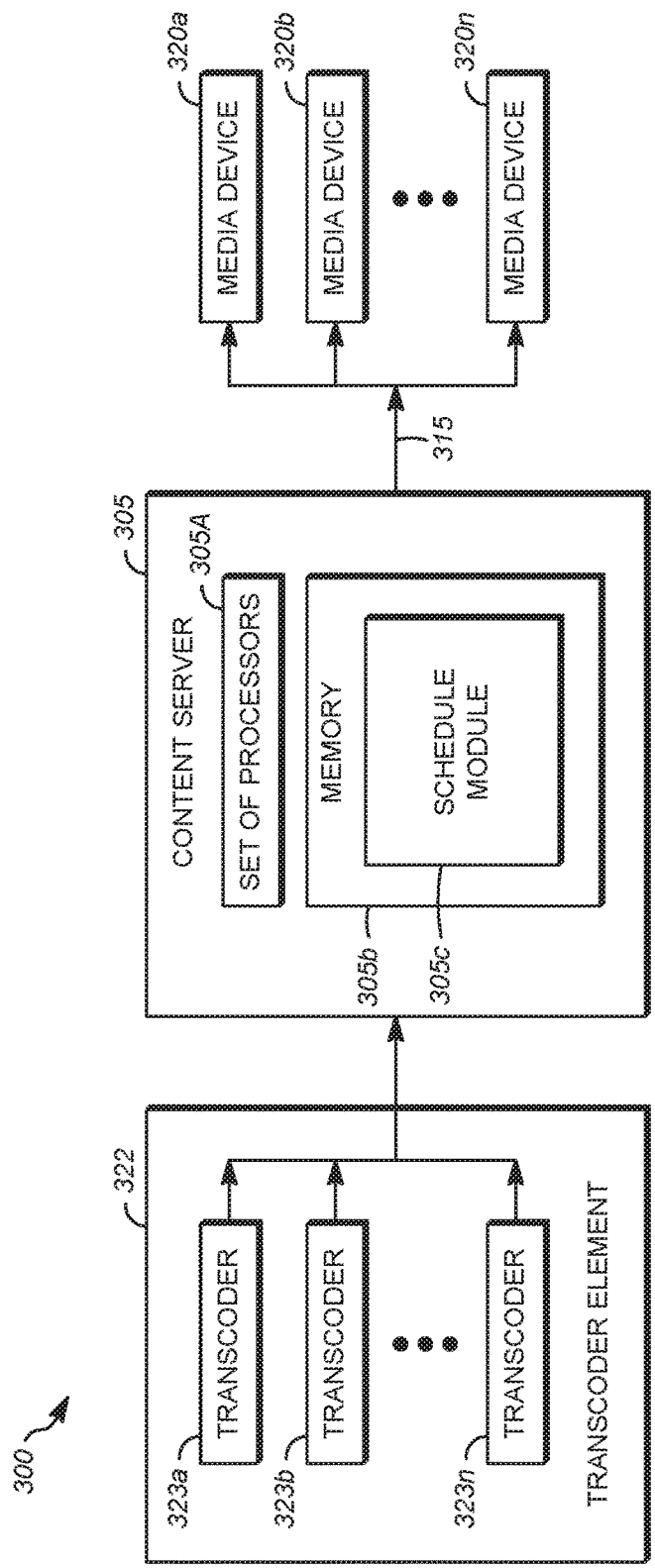
FIG. 3 illustrates an exemplary embodiment of a video and data streaming system.

FIG. 3 illustrates an exemplary embodiment of a video and data streaming system 300. The video streaming system 300 includes a content server 305, a network 315 having at least one communications channel 106, one or more media devices 320, and a transcoder element 322 having one or more transcoder resources. Content server 305 may transmit video content or sets of video streams and data streams to media devices 320 via network 315. A set of video streams may be for a media program, such as a movie, a television program, or similar.

Each video stream in a set of video streams may be a short segment of video (e.g., two second, ten seconds, etc.). A set of video streams may include thousands of video streams for a media program, such as a two-hour movie. As used herein, encoded content such as video transport or elementary stream may be divided into fixed-duration segments (e.g., chunks). The segments or chunks are typically between two and 10 seconds in duration, although they may be longer or shorter. In some embodiments, shorter segments reduce coding efficiency while larger segments impact speed to adapt to changes in network throughput. In some embodiments, the video and audio transport stream is composed of 188-byte transport packets which are grouped together into HLS chunks or segments. For Microsoft HTTP Smooth Streaming, however, the video and audio elementary streams are grouped into separate data blocks, chunked into file fragments, and indexed with the MP4 or ISO-MBFF "boxes" or "atoms" to hint to the player how to find samples (coded video and audio frames) in these containers.

The sets of video streams may be provided to content server 305 from transcoder element 322. Transcoder element 322 includes a number of transcoder resources 323A-323N where each transcoder resource 323 provides a set of video streams having unique encoding parameters (e.g., a bit rate, a resolution, etc.). Network 315 may include the Internet, various intranets, etc. Network 315 may include wired links and wireless links. It will be understood that in at least some of the embodiments discussed herein, the various references made herein to "media" and "video" include both video content and audio content.

Content server 305 includes one or more processors 305a and a non-transitory computer-readable storage medium (memory) 305b. Memory 305b may store instructions, which the processor(s) 305a may execute to carry out various embodiments described herein. Content server 305 may include a number of computer devices that share a domain. Content server 305 also includes a schedule module 305c which controls the delivery of video and data streams to the media devices 320.

A need parameter vector (NPV) is a factor derived from the content of the video stream 102V that provides an estimation of the complexity level of the video stream 102V. NPV is a composite of several factors including Video Complexity ("VC"), Device Profile, Service Priority Level and Codec Profile.

Figure 6:
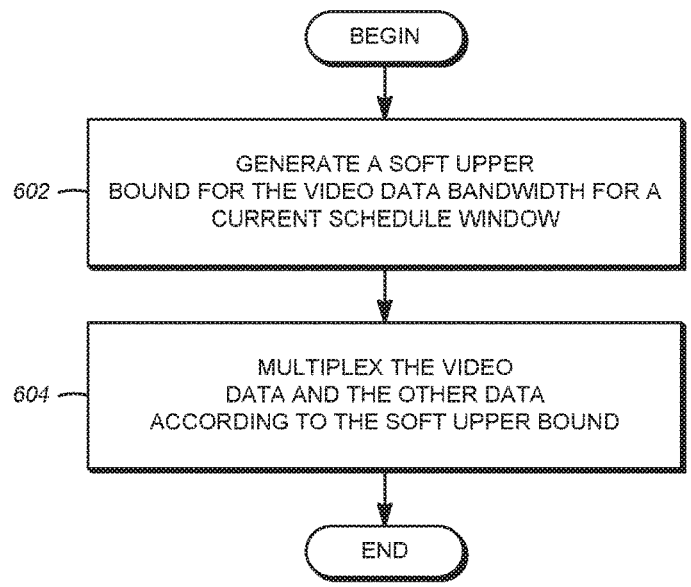
FIG. 6 is a diagram illustrating an exemplary embodiment of operations that can be used to compute $BW_{video}^{soft}(i)$ for each schedule window period.

Given an NPV, content server 305 calculates what bit rate is needed to obtain a targeted level of quality. This information can be provided by a family of curves of bit rate vs. NPV for constant quality, such as illustrated in FIG. 6 of U.S. Pat. No. 8,910,229. The device profile can include the screen size, codec profiles (e.g., MPEG2 and AVC for video or Dolby AC-3 or AAC for audio) that are supported, software/hardware/firmware versions, OS versions, player-application version, etc. of the media device(s) 320. Service priority level can include parameters such as those included in service level agreements such as guaranteed bandwidths supported or access to high definition videos versus standard definition associated with higher and lower cost subscription services, respectively.

NPV can be computed based on complexity of content for different time periods of the media program (e.g. different schedule windows or segments), with the curve of bit rate vs. NPV being linear for any given quality level. Hence, NPV for program A is twice the NPV for program B, it will take program A twice the bit rate as program B to maintain a similar video quality.

Generating a Soft Upper Bound for the Video Data Bandwidth

As described above, multiplexing the video and data using a soft bandwidth upper-bound, denoted as $BW_{video}^{soft}$, rather than hard bandwidth upper bound $BW_{video}$ can result in higher video quality and efficiency. Such adjustment can be made for each schedule window period based on the total combined NPV. Equations (2-3) and (2-4) may be used to compute $BW_{video}^{soft}$ for each schedule window period:

Case 1: $NPV(i) \geq NPV_{average}$ $$BW_{video}^{soft}(i) = (1 + W^+(t) \times \eta(NPV(i) - NPV_{average})) \times BW_{video} \qquad \text{Equation (2-3)}$$

Case 2: $NPV(i) < NPV_{average}$ $$BW_{video}^{soft}(i) = (1 + W^-(t) \times \eta(NPV(i) - NPV_{average})) \times BW_{video} \qquad \text{Equation (2-4)}$$

wherein:
- $i = i^{th}$ schedule window;
- $\eta(\bullet)$ = normalized function for NPV so it will be fitted into range (−1, +1);
- $NPV(i)$ = total combined NPV for $i^{th}$ schedule window;
- $NPV_{average}$ = average value of total combined NPV;
- $W^+(t)$ = a weighted factor to adjust the level of video/data multiplexing for Case 1; and
- $W^-(t)$ = a weighted factor to adjust the level of video/data multiplexing for Case 2.

Figure 4:
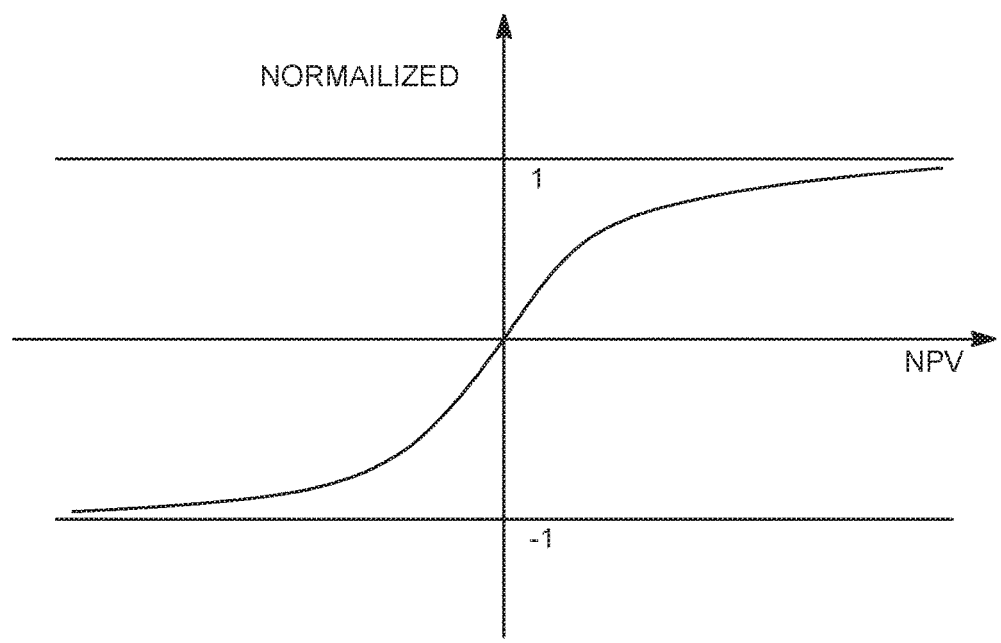
FIG. 4 is a diagram illustrating one example of a normalizing function.

FIG. 4 is a diagram illustrating one example of the normalizing function $\eta(\bullet)$. Note that the normalizing function limits the value of NPV to (−1, +1). Other embodiments of the normalizing function $\eta(\bullet)$ are discussed below.

$W^+(t)$ and $W^-(t)$ can determine the level of multiplexing. $W^+(t)$ can be in the range from 0 to $$\left(\frac{BW_{data}}{BW_{video}}\right),$$

and $W^-(t)$ can be in the range from 0 to 1. Note that $W^+(t)$ and $W^-(t)$ may or may not be chosen as the same function. $W^+=0$ and $W^-=0$ is a special case with zero level of multiplexing video and data and behaves the same as hard capped video bandwidth. Further, when $W^+$ is set to $$\left(\frac{BW_{data}}{BW_{video}}\right),$$

the system is with full level of multiplexing video and data, which means video may use up to the whole available bandwidth BW.

As seen from the Equations (2-3) and (2-4), $BW_{video}^{soft}$ is computed using different weight factors $W^+(t)$ or $W^-(t)$, according to its NPV value. When T is sufficiently large and using symmetric weight factors $W^+(t)$ and $W^-(t)$, $BW_{video}^{soft}$ can be computed based on the Equation (2-3) and (2-4) also satisfies the Equation (2-2).

Video/Data Multiplexing Example Embodiment

Figure 5:
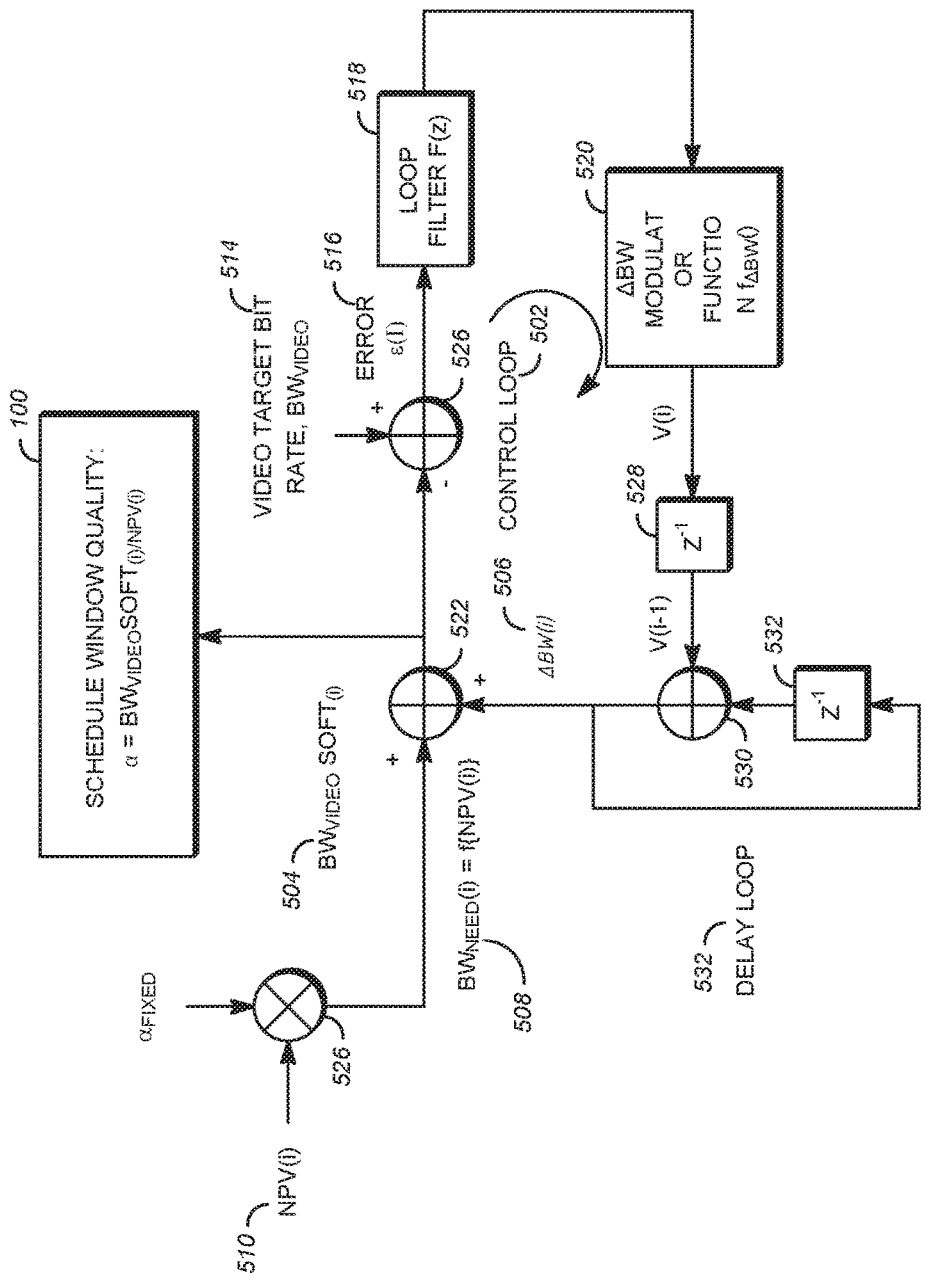
FIG. 5 is a diagram illustrating the application of a system having a control loop to compute $BW_{video}^{soft}$ for each schedule window period

FIG. 5 is a diagram illustrating the application of a system 500 having a control loop 502 to compute $BW_{video}^{soft}$ for each schedule window period (there are many other implementations that could result in a similar control scheme for the scheduled video bandwidth).

To derive a soft upper bound for the video data bandwidth for a current ($i^{th}$) schedule window period $BW_{video}^{soft}(i)$ 504, the control loop 502 calculates values of a video bit rate difference, $\Delta BW(i)$ 506 that, when combined with the instantaneous needed video bandwidth as calculated by the function, $f(NPV(i))$ 508, gives the desired upper bound for the soft video bandwidth value $BW_{video}^{soft}(i)$ 504 for the $i^{th}$ schedule window.

The required video data bandwidth $BW_{need}(i)$ 508 is the product of the Need Parameter Value for the i-th scheduled window, $NPV(i)$ 510, and a quality scale factor, $\alpha_Q$ 512, where $\alpha_Q$ 512 may be set to a predefined fixed value to give a quality target for statistical multiplexing. This quality scale factor $\alpha_Q$ 512 is the same value as referenced in the aforementioned U.S. Pat. No. 8,910,229. A difference, or error $\varepsilon(i)$ 516, between the current ($i^{th}$) upper bound for the soft video data bandwidth $BW_{video}^{soft}(i)$ 504 and a target video bit rate $BW_{video}$ 514 is driven to zero in this control loop 502 using feedback.

Different control loop 502 behavior can be obtained by selecting different loop filter functions, F(z) 518, and bandwidth difference modulator functions, $f_{\Delta BW}(x)$ 520. Note also that the target video bandwidth, $BW_{video}$, 514 can be a time-varying function used to balance the shared channel bandwidth in various ways between data and video. Finally, the soft upper bound for the video data bandwidth (the control loop 503 output, $BW_{video}^{soft}(i)$ for the $i^{th}$ schedule window period determines the adjusted quality scale factor for the $i^{th}$ period, $\alpha_i$, by the calculation $\alpha_i = BW_{video}^{soft}(i) / NPV(i)$ as shown below. This allows a statistically multiplexed video bit rate for this window period to be calculated at the "new" quality level which is used to drive the overall video bit rate to the target video bit rate, $BW_{video}$.

One example of an embodiment that could be used to compute a soft upper bound for the video data bandwidth for a current schedule window $BW_{video}^{soft}(i)$ 504 is presented below. On a top level, the soft upper bound for the video data bandwidth for a current schedule window $BW_{video}^{soft}(i)$ 504 may be computed as the sum of the required video data bandwidth $BW_{need}(i)$ 508 for the current schedule window and an incremental change in video data bandwidth for the current schedule window $\Delta BW(i)$ 506. This can be computed (as indicated by summing element 522 as described in Equation (2-5) below:

$$BW_{video}^{soft}(i) = BW_{need}(i) + \Delta BW(i) \qquad \text{Equation (2-5)}$$
$$= \alpha_Q NPV(i) + \Delta BW(i)$$

The equivalent quality factor $\alpha_i$ applied for the current schedule window is calculated as shown in block 524 from the soft upper bound for the video data bandwidth for a current schedule window $BW_{video}^{soft}(i)$ 508 and the current need parameter value for the schedule window NPV(i) 510 as:

$$\alpha_i = \frac{BW_{video}^{soft}(i)}{NPV(i)} = \frac{\alpha_Q NPV(i) + \Delta BW(i)}{NPV(i)} = \alpha_Q + \frac{\Delta BW(i)}{NPV(i)} \quad \text{Equation (2-6)}$$

the error detector 526 output is:

$$\varepsilon(i) = BW_{video} - BW_{video}^{soft}(i) \quad \text{Equation (2-7)}$$

which is input to the loop filter F(z) 518 whose output feeds the bandwidth difference (modulator?) function 520 resulting in v(i):

$$v(i) = f_{\Delta BW}\{F[\varepsilon(i)]\} \quad \text{Equation (2-8)}$$

giving the final integrated loop output:

$$\Delta BW(i) = \Delta BW(i-1) + v(i-1) \quad \text{Equation (2-9)}$$
$$= \Delta BW(i-1) + f_{\Delta BW}\{F[\varepsilon(i-1)]\}$$

where:
i=$i^{th}$ schedule window;
NPV(i)=total combined NPV for $i^{th}$ schedule window;
$f(NPV(i))$ is a function that represents the instantaneous needed video bandwidth based on the NPV(i) value, i.e., $f\{NPV(i)\} = \alpha_Q NPV(i)$;
$\Delta BW(i)$ is the video bandwidth difference needed to drive $f(NPV(i))$ to the desired soft video bandwidth value;
$f_{\Delta BW}(x)$ is a function that modulates the bandwidth difference calculation;
and $F(\varepsilon)$ is a loop filter on the video bandwidth error, $\varepsilon$.

As an example of the implementation of Equations (2-5) to (2-9), a first-order loop may have a simple gain stage as the loop filter function, e.g., $F(z) = K_a$, and the bandwidth modulator function could be a symmetric linear gain, $f_{\Delta BW}(x) = K_v$. This results in the loop difference equations:

$$BW_{video}^{soft}(i) = BW_{need}(i) + \Delta BW(i) \quad \text{Equation (2-10)}$$
$$= \alpha_Q NPV(i) + \Delta BW(i)$$
$$= \alpha_Q NPV(i) + \Delta BW(i-1) + K_a K_v \varepsilon(i-1)$$
$$= \alpha_Q NPV(i) + \Delta BW(i-1) +$$
$$K_a K_v \left[ BW_{video} - BW_{video}^{soft}(i-1) \right]$$

FIGS. 6-10 are diagrams illustrating an exemplary embodiment of operations that can be used to compute $BW_{video}^{soft}(i)$ for each schedule window period.

Turning first to FIG. 6, block 602 generates a soft upper bound for the video data bandwidth for a current schedule window $BW_{video}^{soft}(i)$ 504. Block 604 multiplexes the video data and other data according to the soft upper bound $BW_{video}^{soft}(i)$ 504.

Figure 7:
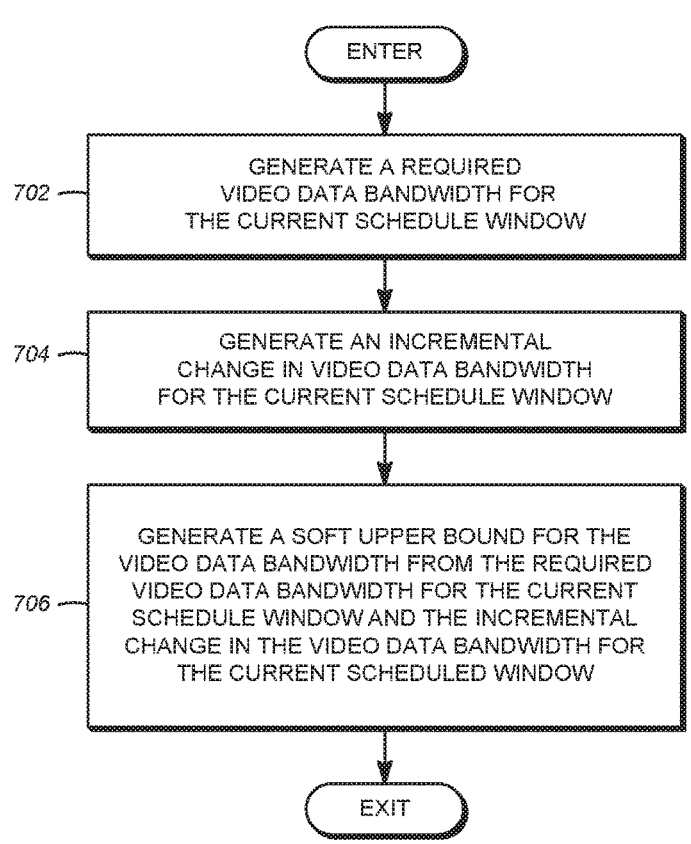
FIG. 7 is a diagram illustrating exemplary operations that can be used to generate the soft upper bound for the current schedule window $BW_{video}^{soft}(i)$.

FIG. 7 is a diagram illustrating exemplary operations that can be used to generate the soft upper bound for the current schedule window $BW_{video}^{soft}(i)$ 504. In block 704, a required video data bandwidth for the current schedule window $BW_{need}(i)$ 508 is generated. In block 704, an incremental change in the video data bandwidth for the current schedule window $\Delta BW(i)$ 506 is generated. In one embodiment, this is generated using the control loop 502 as described further below. In block 706, the soft upper bound for the video data bandwidth for the current schedule window $BW_{video}^{soft}(i)$ 504 is generated from the required video data bandwidth for the current schedule window $BW_{need}(i)$ 508 and the incremental change in the video data bandwidth for the current scheduled window $\Delta BW(i)$ 506. In the embodiment illustrated in FIG. 5, this is accomplished by summing the required video data bandwidth for the current schedule window $BW_{need}(i)$ 508 and the incremental change in the video data bandwidth for the current scheduled window $\Delta BW(i)$ 506 using summer 522.

Figure 8:
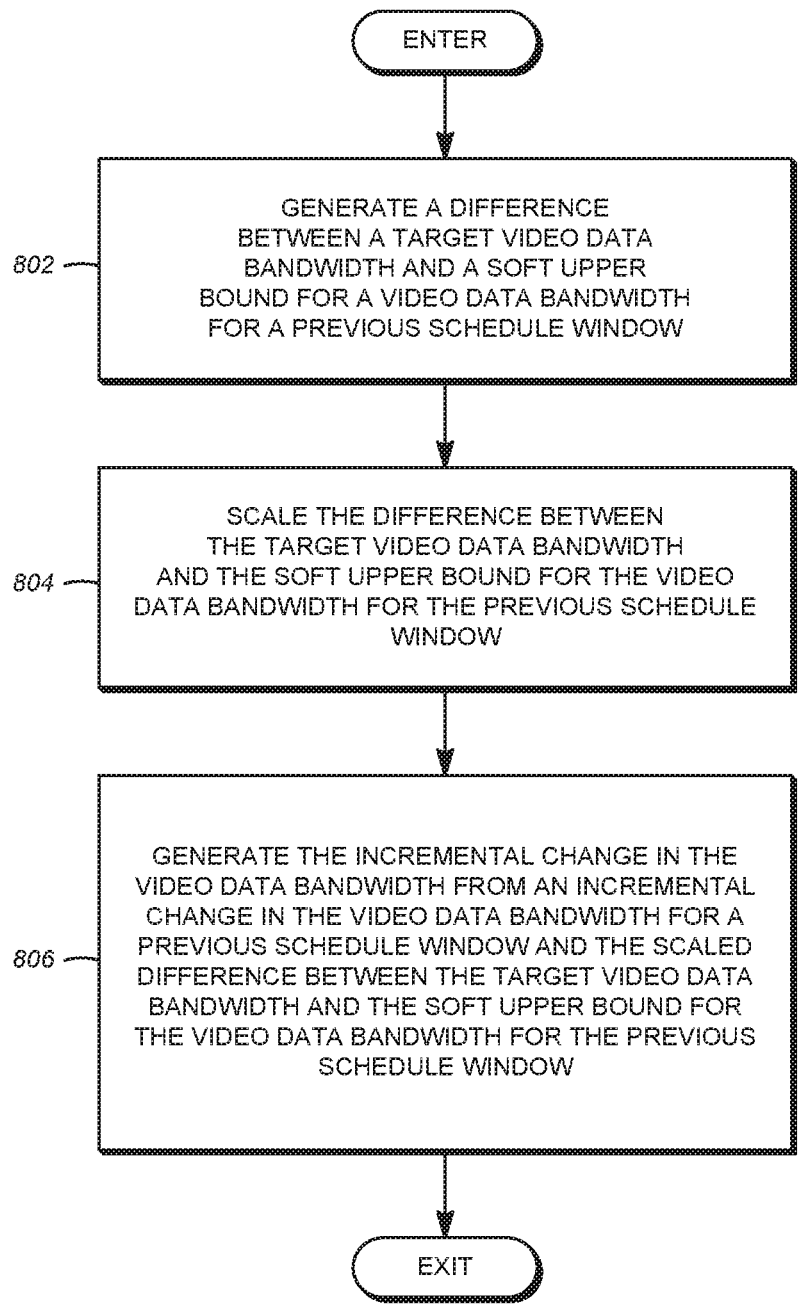
FIG. 8 is a diagram illustrating exemplary operations that can be used to generate the incremental change in the video bandwidth for the current scheduled window $\Delta BW(i)$.

FIG. 8 is a diagram illustrating exemplary operations that can be used to generate the incremental change in the video bandwidth for the current scheduled window $\Delta BW(i)$ 506. Block 802 generates a difference between a target video bandwidth $BW_{video}$ 514 for the current schedule window and a soft upper bound for a video data bandwidth for a previous schedule window $BW_{video}^{soft}(i-1)$ 508'. In the illustrated embodiment, this is accomplished using differencing element 526. Block 804 scales the difference between the target video data bandwidth $BW_{video}$ 514 and the soft upper bound for the video data bandwidth for the previous schedule window $BW_{video}^{soft}(i-1)$ 508'.

In the embodiment illustrated in FIG. 5, the scaling operation is performed by digital loop filter 518 and modulator 520. The digital loop filter 518 may comprise a simple gain $K_a$ or may comprise a digital loop filter having a z-transform F(z). In either case, the input/output characteristic of the loop filter 518 is to scale the value presented as an input to the filter. In the simple gain embodiment, the scale factor remains constant, whereas in the digital filter embodiment, the scaling of the output to the input of the filter 518 is time varying according to the characteristics of the filter. The modulator 520 may comprise a symmetric linear gain $f_{\Delta BW}(x) = K_v$. Different embodiments of the modulator 520 are discussed with respect to FIG. 11 below.

Finally, block 806 generates the incremental change in the video data bandwidth $\Delta BW(i)$ 506 from an incremental change in the video data bandwidth for a previous schedule window $\Delta BW(i-1)$ and the scaled difference between the target video data bandwidth $BW_{video}$ 514 and the soft upper bound for the video data bandwidth for the previous schedule window $BW_{video}^{soft}(i-1)$ 508' (depicted as v(i) in FIG. 5.

In the embodiment depicted in FIG. 5, the incremental change in the video data bandwidth for a previous schedule window $\Delta BW(i-1)$ is created by a delay loop 532, which uses delay element 532 to provide the incremental change in the video data bandwidth for a previous schedule window $\Delta BW(i-1)$ to summing element 530, where it is added to the scaled difference between the target video data bandwidth $BW_{video}$ 514 and the soft upper bound for the video data bandwidth for the previous schedule window $BW_{video}^{soft}(i-1)$ 508' delayed by delay element 528.

Figure 9:
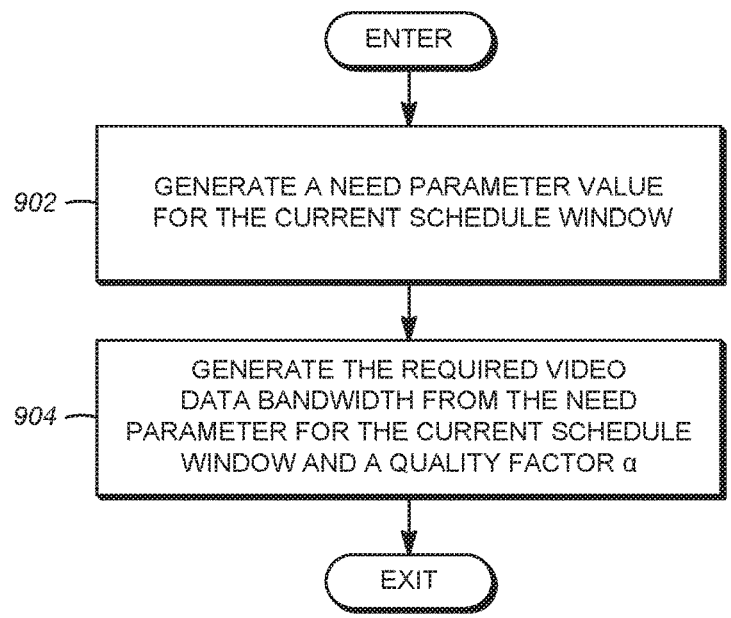
FIG. 9 is a diagram illustrating exemplary operations that can be used to generate the required video data bandwidth $BW_{need}(i)$.

FIG. 9 is a diagram illustrating exemplary operations that can be used to generate the required video data bandwidth $BW_{need}(i)$ 508. Block 902 generates a need parameter value for the current schedule window NPV(i) 510. Block 904 generates the required video data bandwidth $BW_{need}(i)$ from the need parameter for the current schedule window NPV(i) 510 and a quality factor ☐☐512. In the embodiment illustrated in FIG. 5, the required video data bandwidth $BW_{need}(i)$ 508 is the product of the need parameter for the current schedule window NPV(i) 510 and the quality factor ☐☐512. The need parameter value for the current schedule window NPV(i) 510 is a composite of several factors including Video Complexity ("VC"), Device Profile, Service Priority Level, Codec Profile, etc., and can be derived as described above.

Figure 10:
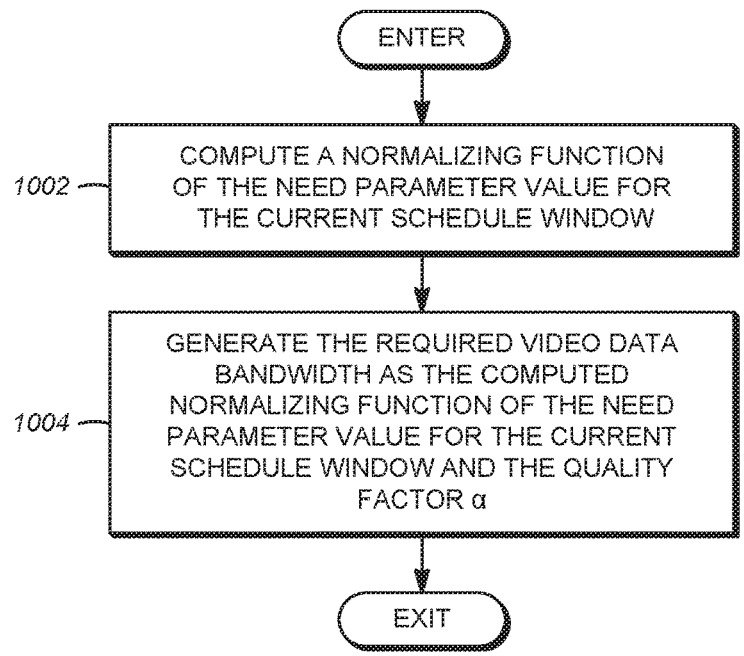
FIG. 10 is a diagram illustrating exemplary operations that can be used to generate the required video data bandwidth NPV(i)

FIG. 10 is a diagram illustrating exemplary operations that can be used to generate the required video data bandwidth NPV(i) 510. Block 1002 computes a normalizing function $f(\bullet)$ of the need parameter value for the current schedule window $f(NPV(i))$. Block 1004 generated the required video data bandwidth $BW_{need}(i)$ 508 as the computed normalizing function of the need parameter for the current schedule window $f(NPV(i))$ and the quality factor $\alpha$.

In one embodiment, the normalizing function is as illustrated in FIG. 4, with larger absolute values of NPV asymptotically and continuously approaching +1 or −1. One such function is $$\frac{2}{\pi}$$

arctan (NPV). The normalizing function may be continuous, piecewise continuous, or non-linear.

Figure 11:
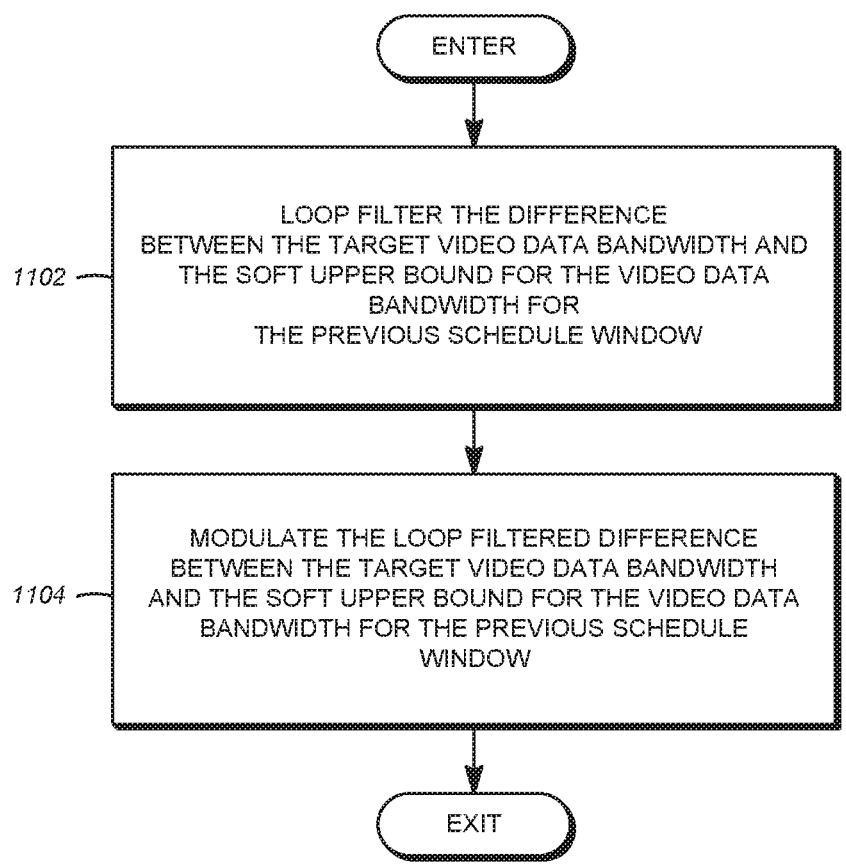
FIG. 11 is a diagram illustrating illustrative operations that can be performed to scale the difference between the target video data bandwidth $BW_{video}$ and the soft upper bound for the video data bandwidth for the previous schedule window $BW_{video}^{soft}(i-1)$.

FIG. 11 is a diagram illustrating illustrative operations that can be performed to scale the difference between the target video data bandwidth $BW_{video}$ and the soft upper bound for the video data bandwidth for the previous schedule window $BW_{video}{}^{soft}(i-1)$. In this embodiment, instead of simply scaling difference between the target video data bandwidth $BW_{video}$ and the soft upper bound for the video data bandwidth for the previous schedule window $BW_{video}{}^{soft}(i)$ by constant values $K_a$ and $K_v$, a digital loop filter 518 is employed as well as a modulator 520. Referring now to FIG. 11, block 1102 loop filters the difference between the target video data bandwidth $BW_{video}$ and the soft upper bound for the video data bandwidth for the previous schedule window $BW_{video}{}^{soft}(i-1)$. This can be performed, for example, using loop filter 518 having a z-transform F(z). This loop filter may be recursive or non-recursive, and may operate as a low, high, or band pass filter. Block 1104 modulates the loop filtered difference between the target video data bandwidth $BW_{video}$ 514 and the soft upper bound of the video data bandwidth for the previous schedule window $\Delta BW(i-1)$ 508'. This can be performed, for example, using modulator 520.

Figure 12A:
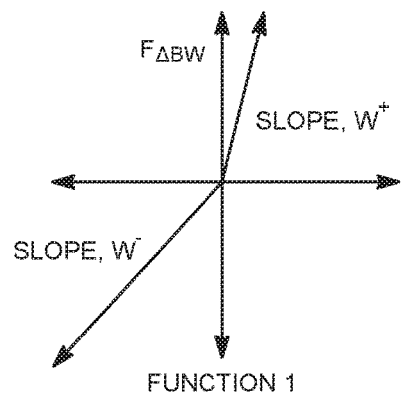
FIGS. 12A-12C are diagrams illustrating exemplary modulating functions $f_{\Delta BW}(x)$.
Figure 12B:
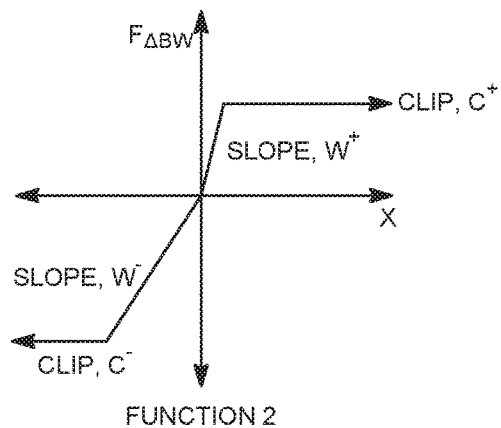
Figure 12C:
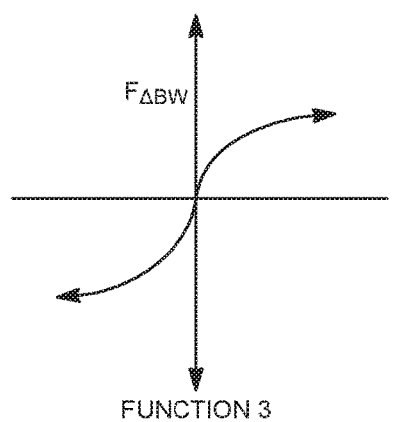

FIGS. 12A-12C are diagrams illustrating exemplary modulating functions $f_{\Delta BW}(x)$. The purpose of the modulating function is to control the response of the soft upper bound of the video data bandwidth to changes to the schedule window need parameter vector NPV(i) demands. This functions similar to the voltage control oscillator (VCO) gain curve in a phase-locked-loop (PLL). For example, function 1 of FIG. 12A has different linear slopes ($W^+$ when the input is positive and $W^-$ when the input is negative), thus permitting a control loop having different response times depending on changes to the schedule window need parameter vector NPV(i) demands is positive or negative. Function 2 of FIG. 12B also has different linear slopes, and also includes clipping the value of $f_{\Delta BW}(x)$ to an upper clipping value $C^+$ for positive values of the input and lower clipping value $C^-$ for negative values of the input. Clipping provides an additional control to reduce the responsiveness of the control loop 502 to changes in the target video data bandwidth $BW_{video}$ 514 or the soft upper bound of the video data bandwidth for the previous schedule window $\Delta BW(i-1)$ 508' by capping the input to summer 530. Further, such control may be provided independently for positive and negative input values. Function 3 of FIG. 12C illustrates a continuous function for $f_{\Delta BW}(x)$ also limiting the maximum value for v(i), but doing so as a continuous function of the input. One example of such a function is $$f_{\Delta BW}(x) = \frac{2}{\pi}\arctan(x).$$

Other continuous functions may be used as well, including $$f_{\Delta BW}(x) = x^{\frac{1}{n}}$$

where in is an integer greater than one.

Since the data bandwidth, as employed in Equation (2-1) is the difference of between the fixed channel bandwidth cap, BW, and the video bandwidth, the bandwidth difference modulator function 520 can control a bias for the control loop 502 to respond faster or slower to changes to the required video data bandwidth $BW_{need}(i)$ 508, although the faster response may result in some overshoot. However, although use of the modulator Function 1 from FIG. 12A with $W^+>W^-$ would result in an quicker response of the control loop 502 to a service provider's change from one target bit rate to another (for example, changing a given 256QAM 38.8 Mbps allocation from being 30 Mbps video+ 8.8 Mbps data to 33 Mbps video+5.8 Mbps data), use of this function may result in a temporarily "overshoot" and cause the data bandwidth to go low while the video goes high before settling into the target bitrate). An average bias can result in which the video and data graphs of FIG. 15 will be average slightly above and below, respectively, the target bitrates set by the operator for this asymmetric $W^+>W^-$.

Figure 13:
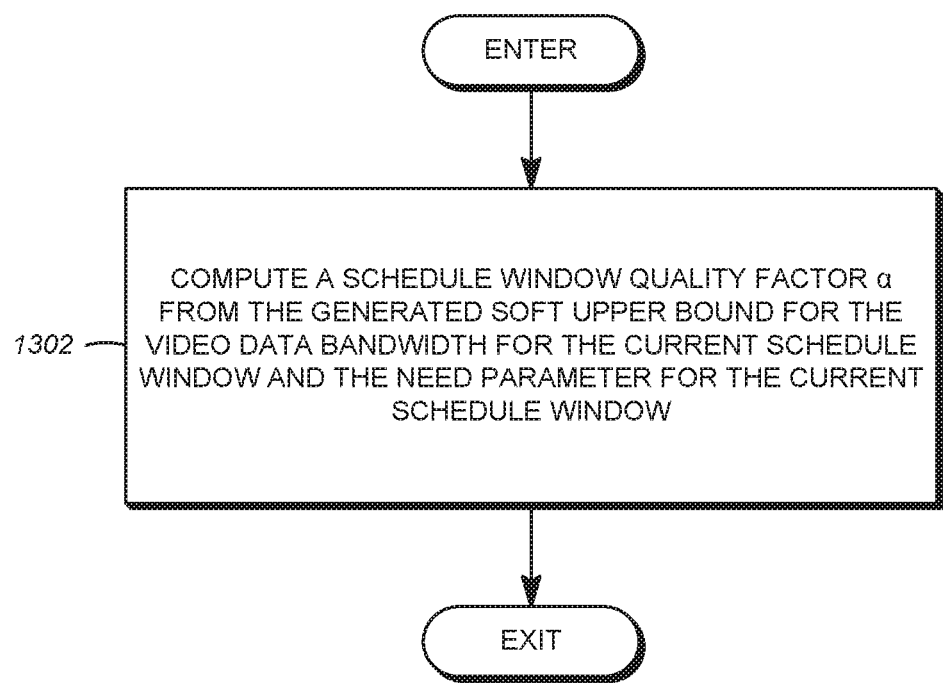
FIG. 13 is a diagram illustrating the computation of a revised schedule window quality factor $\alpha$.

FIG. 13 is a diagram illustrating the computation of a revised schedule window quality factor $\alpha$. Block 1302 computes a schedule window quality factor $\alpha_i$ from the generated soft upper bound for the video data bandwidth for the current schedule window $BW_{video}{}^{soft}(i)$ 504 and the need parameter for the current schedule window NPV(i) 510. This is further illustrated in block 524 of FIG. 5

Operational Examples

Figure 14:
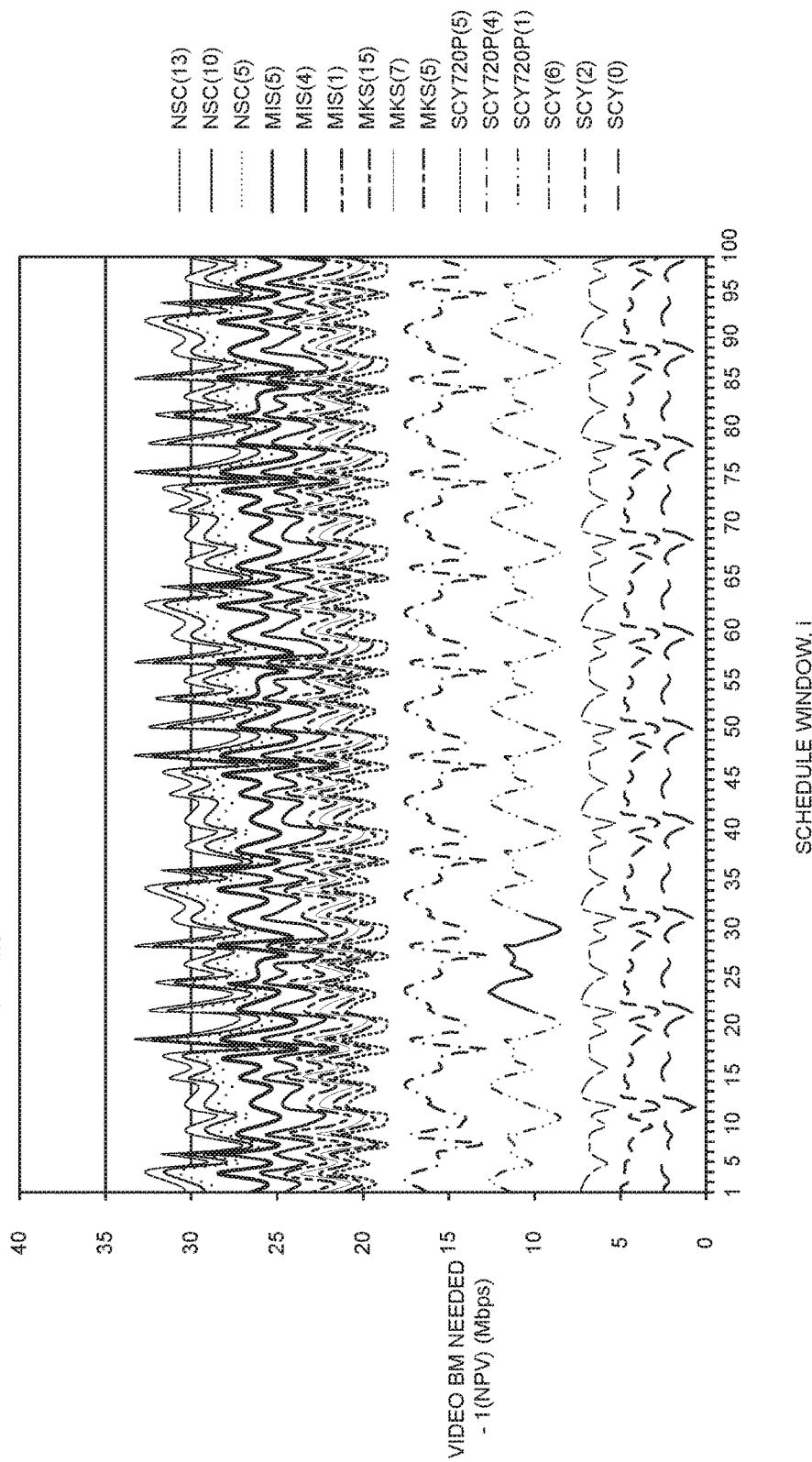
FIG. 14 presents a plot illustrating the allocation of bandwidth to video and other data as described above for an example set of NPV(i) values.

FIG. 14 presents a plot illustrating the allocation of bandwidth to video and other data as described above for an example set of NPV(i) values. For this example, it is assumed that a number of video subscribers are sharing a communications channel having a bandwidth BW=38.8 Mbps. For example, the data payload may comprise a DOCSIS 256-QAM transport payload carried on a single RF carrier with a plurality of subscribers (data consumers).

For a hypothetical schedule window duration of 20 secs and an initial 15 subscribers watching 5 different looped video clips, FIG. 14 shows a stacked graph of the needed video bandwidth, $BW_{need}(i)=f\{NPV(i)\}$, for the first 100 schedule window periods as calculated from the sum of the need parameter values NPV(i) for individual 2-sec video chunks over a 20 sec window. In example, three subscribers are watching looped clip in a VGA format ("Bey"), but at different points in the clip (i.e., not synchronized). For example, the curve Bey(0) reflects that the first subscriber (subscriber-1) is watching the clip starting from its beginning in schedule window 1 while Bey(2) implies that a second subscriber (subscriber-2) is watching the clip at a point that is 2×20 sec=40 sec from its beginning during schedule window 1. The clips "Bey," "Bey720p," and "His" have video content that is difficult to encode (and hence, have a comparatively high need parameter NPV(i)) while clips "FKB" and "NBC" have video content that is less difficult to encode (and hence, have a lower need parameter NPV(i)). The aggregate video bandwidth needed over this 100 schedule window period varies around about 30 Mbps.

Figure 15:
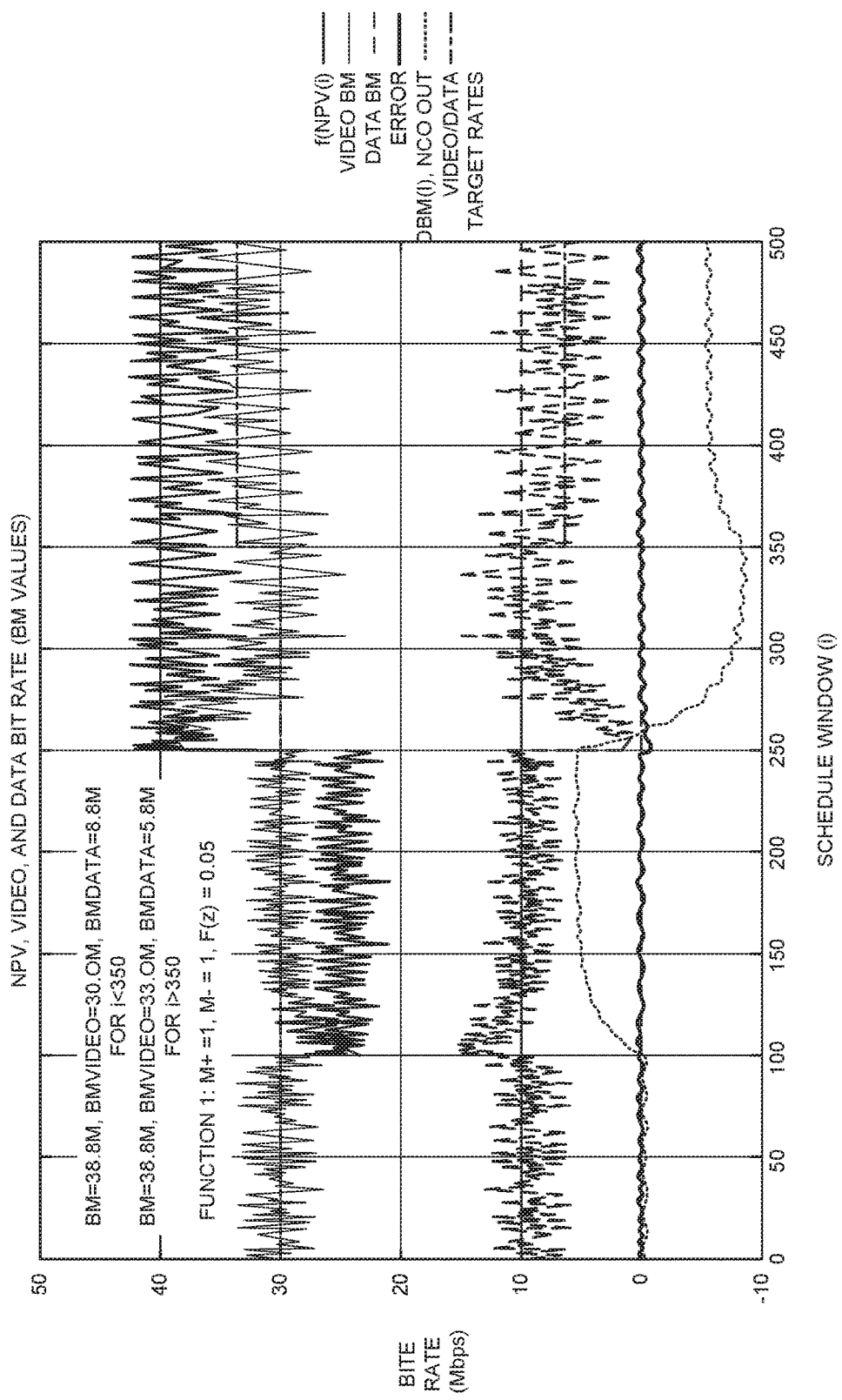
FIG. 15 is a diagram illustrating the control loop operation for a set of normalized need parameter values $f\{NPV(i)\}$, including the first 100 schedule window values of example of FIG. 14.

FIG. 15 is a diagram illustrating the control loop operation for a set of normalized need parameter values $f\{NPV(i)\}$, including the first 100 schedule window values of example of FIG. 14. The loop parameters for this example include a simple gain stage for the loop filter 518, F(z)=0.05, which results in a first-order tracking control loop 502. The bandwidth modulator function 520 is modeled as symmetric about the origin with a linear, unity gain such that $W^+=W^-=1.0$, and no clipping.

In this simulation, the fifteen subscribers are reduced to twelve at schedule window i=100 at which point the "His" loop clip hypothetically ends and the aggregate needed video bandwidth drops to an average of about 25 Mbps. The hypothetical input normalized need parameter value $f\{NPV(i)\}$ changes again at schedule window i=250 when three subscribers join in watching the high need parameter Bey720p clip. The needed normalized video bandwidth $f\{NPV(i)\}$ increases to about 38-39 Mbps with peaks exceeding 40 Mbps.

The control loop 502 is seen to drive the soft upper bound for the current schedule window $BW_{video}^{soft}(i)$ 504 to the target video bandwidth $BW_{video}$ 514=30 Mbps at the transitions at i=100 and i=250. Note that the assigned soft upper bound for the current schedule window $BW_{video}^{soft}(i)$ 504 is capped at the needed normalized video bandwidth $f\{NPV(i)\}$ on this channel to BW=38.8 Mbps. As an example of further dynamic control over the data rates, the high (~40 Mbps) required video data bandwidth for the current schedule window $BW_{need}(i)$ 508 for schedule windows i>250 shows that the video users for this example are suffering lower quality as the loop drives the video bit rate to the target 30 Mbps. The target video bandwidth $BW_{video}$ 514 could be increased at the expense of the data bandwidth as shown in FIG. 15 at schedule window i=350 in which the target video bandwidth $BW_{video}$ 514 is increased to 33 Mbps. The loop drives the average video rate to 33 Mbps leaving the average data bandwidth at 5.8 Mbps.

Guaranteed Quality of Service (QoS) Data Services

In above disclosure, we have discussed a method for multiplexing video and data. However, certain data services such as VoIP may require a guaranteed QoS, which means at any time, data rate for this service should not be compromised. In such cases, if the data service requires bandwidth of $BW_{data}$, this bandwidth may not be taken away from the data service and allocated to the video service. Depending on the activities of data services, the actual data rate may still fluctuate over time, and will not exceed $BW_{data}$. In a typical cable modem termination system (CMTS) system, unused bandwidth in data services is then used by stuffing the video stream with MPEG-TS null packets. Instead of inserting such null packets, the extra bandwidth can be allocated to deal with fast startup and channel changes.

Figure 16:
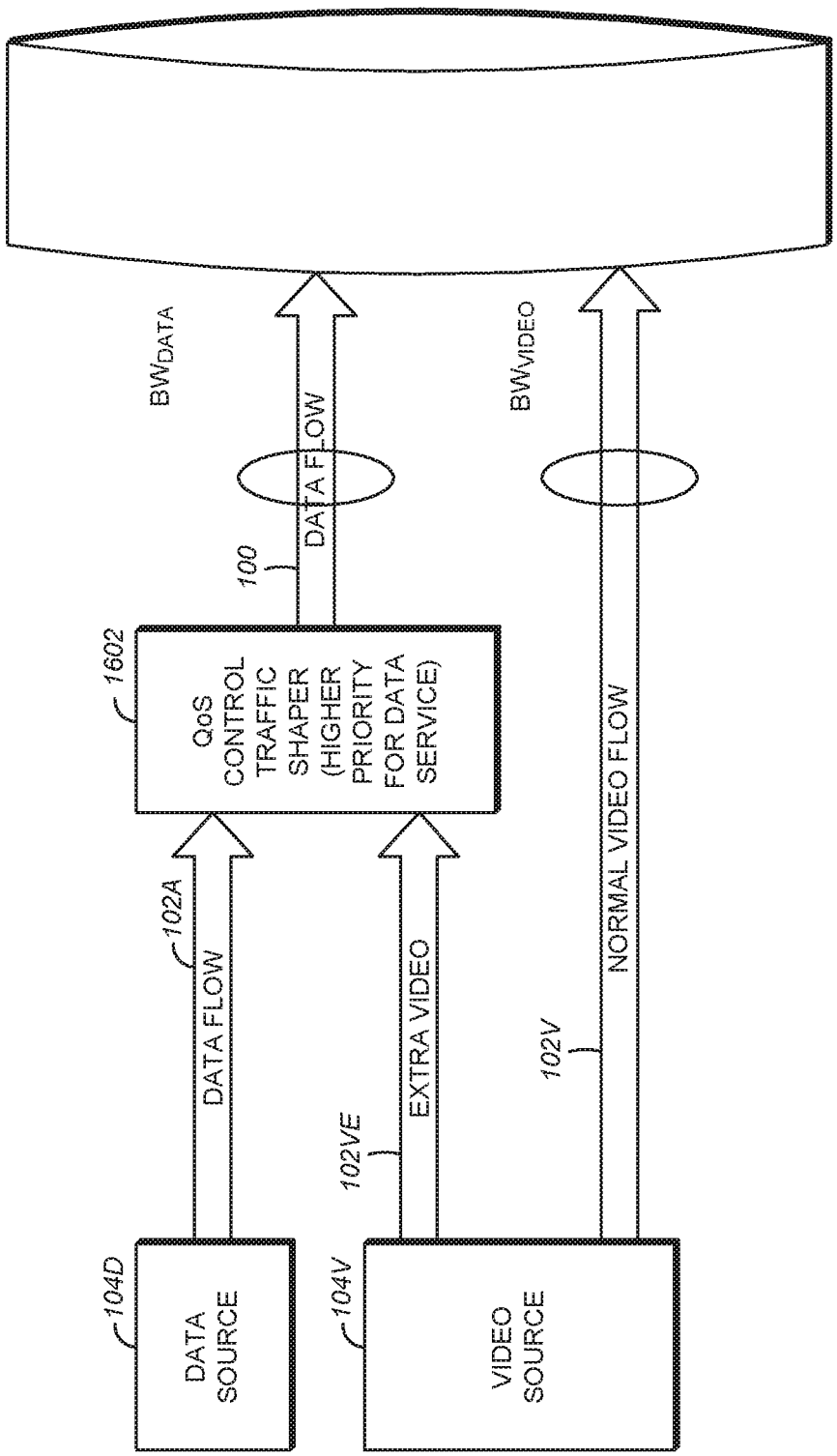
FIG. 16 is a diagram depicting another embodiment of the content aware adaptive streaming system.

FIG. 16 is a diagram depicting another embodiment of the content aware adaptive streaming (CASS) system 100. The system comprises one or more data sources 104D producing one or more data flows or streams 102D and one or more video sources 104V producing one or more video flows or streams 102V. The video flows include a normal video flow 102VN and an extra video flow 102VE. In this embodiment, instead of inserting null data packets left over from a QoS-constrained minimum bandwidth for data services as null packets into the normal video flow, the extra video packets are allocated to provide extra bandwidth to the video signal to deal with higher bandwidth situations such as fast startup and fast channel changes. In such embodiments, the extra video packets are provided to a QoS control traffic shaper 1602 which prioritizes the data flow in favor of the data 102A, but multiplexes in data packets from the video source 104V necessary to accommodate the high bandwidth situations.

Hardware Environments

Figure 17:
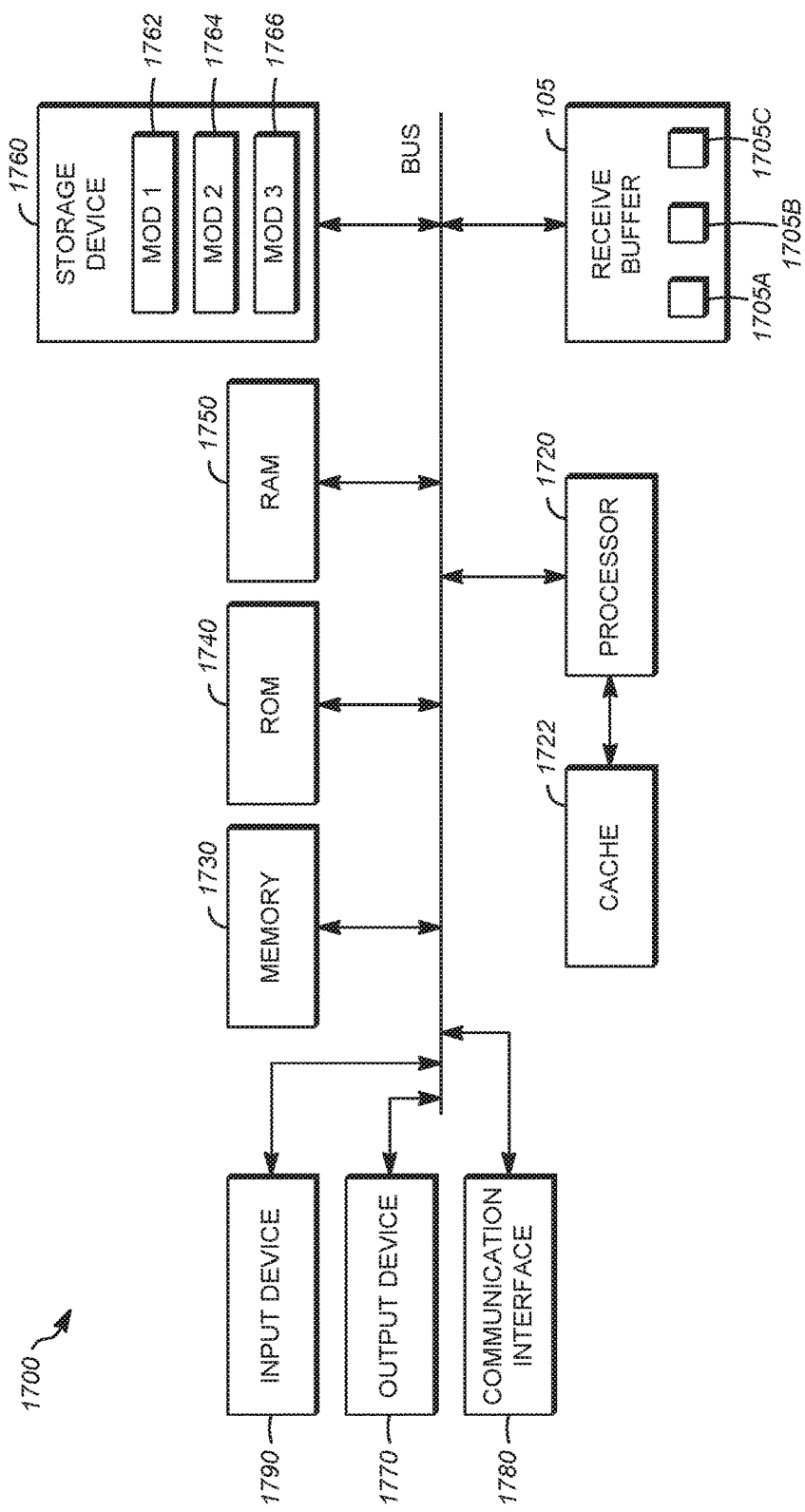
FIG. 17 is an example media device.

FIG. 17 is an example media device 1700 includes a processing unit 1720 and a system bus 1710 that couples various system components including the system memory 1730 such as read-only memory ("ROM") 1740 and random-access memory ("RAM") 1750 to the processor 1720. The media device 1700 can include a cache 1722 of high-speed memory connected directly with, in close proximity to, or integrated as part of the processor 1720. The media device 1700 may be configured to copy data from the memory 1730 or a storage device 1760 to the cache 1722 for quick access by the processor 1720. In this way, the cache 1722 provides a performance boost that avoids processor delays while waiting for data. These and other modules can control or be configured to control the processor 1720 to perform various actions. Other system memory 1730 may be available for use as well. The memory 1730 can include multiple different types of memory with different performance characteristics. It can be appreciated that the disclosure may operate on a media device 1700 with more than one processor 1720 or on a group or cluster of computing devices networked together to provide greater processing capability. The processor 1720 can include any general-purpose processor and a hardware module or software module, such as module 17 1762, module 2 1764, and module 3 1766 stored in the storage device 1760 and configured to control the processor 1720 as well as a special-purpose processor where software instructions are incorporated into the actual processor design. The processor 1720 may essentially be a completely self-contained computing system, containing multiple cores or processors, a bus, memory controller, cache, etc. A multi-core processor may be symmetric or asymmetric.

The system bus 1710 may be any of several types of bus structures including a memory bus or memory controller, a peripheral bus, and a local bus using any of a variety of bus architectures. A basic input/output system stored in ROM 1740 or the like may provide the basic routine that helps to transfer information between elements within the media device 1700, such as during start-up. The media device 1700 further includes storage devices 1760, such as a hard disk drive, a magnetic disk drive, an optical disk drive, tape drive, or the like. The storage device 1760 is connected to the system bus 1710 by a drive interface. The drives and the associated computer-readable storage media provide non-volatile storage of computer-readable instructions, data structures, program modules, and other data for the media device 1700. In some embodiments, a hardware module that performs a particular function includes the software component stored in a non-transitory computer-readable medium in connection with the necessary hardware components, such as the processor 1720, bus 1710, display 1770, and so forth, to carry out the function. The basic components are known to those of skill in the art and appropriate variations are contemplated depending on the type of device, such as whether the device 1700 is a small, handheld computing device, a desktop computer, a computer server, or the like.

Although some implementations employ the hard disk 1760, it should be appreciated by those skilled in the art that other types of computer-readable media which can store data that are accessible by a computer, such as magnetic cassettes, flash memory cards, digital versatile disks, cartridges, RAM 1750, ROM 1740, a cable or wireless signal containing a bit stream and the like, may also be used in the exemplary operating environment. Non-transitory computer-readable storage media expressly exclude media such as energy, carrier signals, electromagnetic waves, and signals per se.

Media device 1700 also includes a receive buffer 1705 that includes three buffer sections 1705A, 1705B, and 1705C. A first buffer section 1705A may be for video packets that media device 1700 has received from a content server but has not consumed for media play. Media device 1700 may have acknowledged receipt of the video packets in the first buffer section 1705B to the content server via an acknowledgment. A buffer management module (not shown) may monitor the rate at which video packets in the first buffer section 1705A are retrieved for consumption by media device 1700.

A second buffer section 1705B may be for video packets that media device 1700 has received from a content server but has not consumed for media play. Media device 1700 may not have sent acknowledgments to the content server for the video packets in the second buffer section 1705B. Portions of the second buffer section 1705B may be categorized as a portion of the first buffer section 1705A as acknowledgments for video packets in the second buffer section 1705B are transmitted to the content server from media device 1700. A buffer management module (not shown) may track the portions of the second buffer section 1705B that are categorized as a portion of the first video buffer 1705A when media device 1700 sends an acknowledgment to the content server for acknowledging receipt of the video packets in the second buffer section 1705B.

A third buffer section 1705C may be available for receipt of video packets. A buffer management module (not shown) may monitor the third buffer section 1705C to determine when the third buffer section 1705C receives video packets and is categorized as a portion of the second buffer section 1705B. Portions of the first buffer section 1705A may be categorized as a portion of the third buffer section 1705C as video packets from the first buffer section 1705A are consumed. That is, the portion of the first buffer section 1705A for which video packets are consumed may receive new video packets from the content server.

The sizes of the first, second, and third buffer sections 1705A-105c together define the maximum buffer size for video-packet buffering according to some embodiments. The maximum buffer size may be allocated by the media device 1700 when opening an initial connection with a content server. The maximum buffer size typically remains unchanged after the allocation.

To enable user interaction with the media device 1700, an input device 1790 represents any number of input mechanisms, such as a microphone for speech, a touch-sensitive screen for gesture or graphical input, keyboard, mouse, motion input, speech and so forth. An output device 1770 can also be one or more of a number of output mechanisms known to those of skill in the art. In some instances, multimodal systems enable a user to provide multiple types of input to communicate with the media device 1700. The communications interface 1780 generally governs and manages the user input and system output. There is no restriction on operating on any particular hardware arrangement, and therefore the basic features here may easily be substituted for improved hardware or firmware arrangements as they are developed.

For clarity of explanation, the illustrative system embodiment is presented as including individual functional blocks, including functional blocks labeled as a "processor" or processor 1720. The functions these blocks represent may be provided through the use of either shared or dedicated hardware, including, but not limited to, hardware capable of executing software and hardware, such as a processor 1720, that is purpose-built to operate as equivalent to software executing on a general-purpose processor. For example the functions of one or more processors presented in FIG. 17A may be provided by a single shared processor or multiple processors. Illustrative embodiments may include microprocessor or digital signal processor ("DSP") hardware, ROM 1740 for storing software performing the operations discussed below, and RAM 1750 for storing results. Very large scale integration ("VLSI") hardware embodiments, as well as custom VLSI circuitry, in combination with a general purpose DSP circuit, may also be provided.

The logical operations of the various embodiments may be implemented as: (1) a sequence of computer-implemented steps, operations, or procedures (generally "instructions") running on a programmable circuit within a general-use computer, (2) a sequence of computer-implemented steps, operations, or procedures running on a specific-use programmable circuit, or (3) interconnected machine modules or program engines within the programmable circuits. The media device 1700 shown in FIG. 17 can practice all or part of the disclosed methods, or can be a part of the disclosed systems, or can operate according to instructions in the disclosed computer-readable storage media. Such logical operations can be implemented as modules configured to control the processor 1720 to perform particular functions according to the programming of the module. For example, FIG. 17 illustrates three modules Mod1 1762, Mod2 1764, and Mod3 1766 which are modules configured to control the processor 1720. These modules may be stored on the storage device 1760 and loaded into RAM 1750 or memory 1730 at runtime or may be stored as would be known in the art in other computer-readable memory locations.

Figure 18:
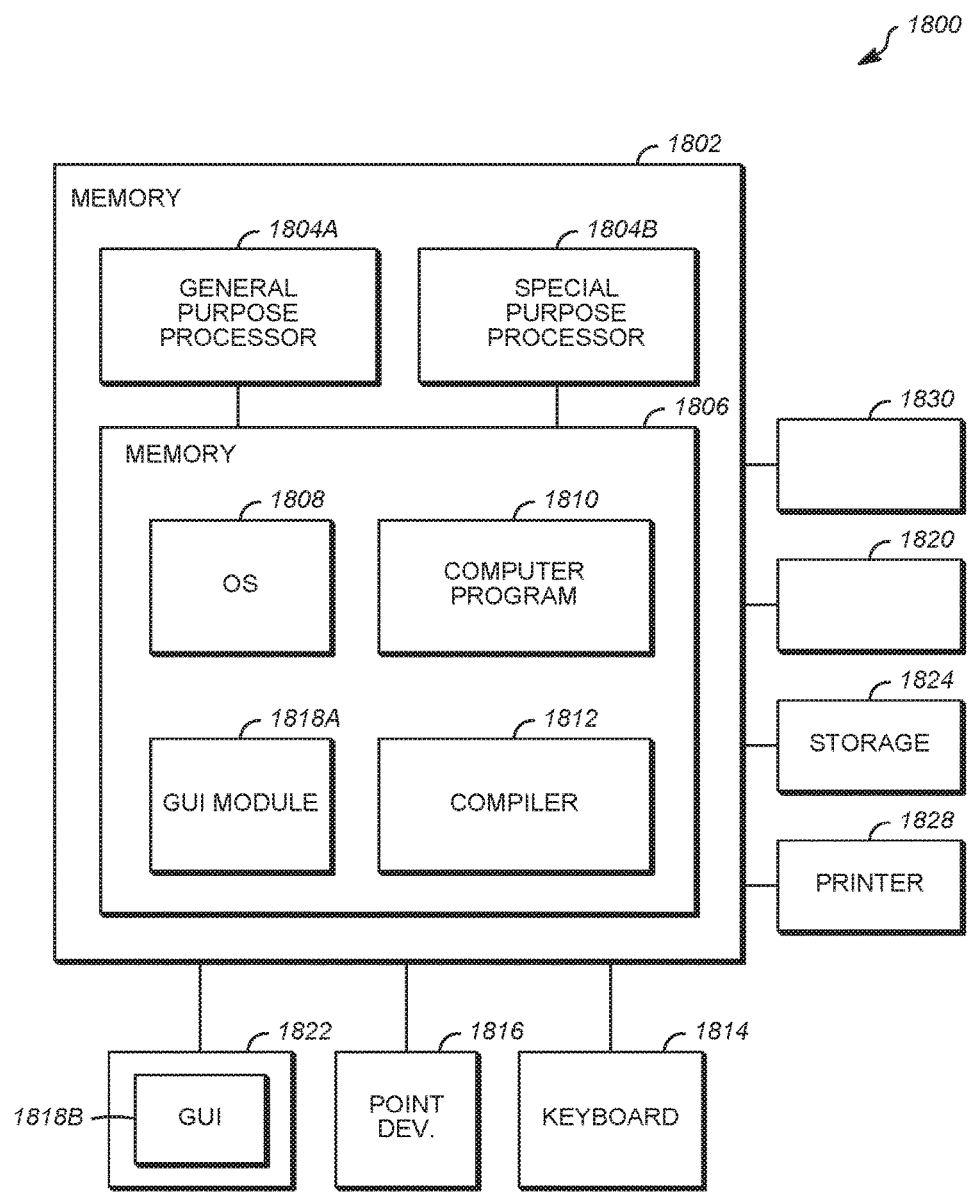
FIG. 18 is a diagram illustrating an exemplary computer system 1800 that could be used to implement elements of this disclosure.

FIG. 18 is a diagram illustrating an exemplary computer system 1800 that could be used to implement elements of this disclosure, including multiplexer 108, data source 104D, video source 104V, transcoder element 322, content server 305 or media devices 320. A computer 1802 comprises a general purpose hardware processor 1804A and/or a special purpose hardware processor 1804B (hereinafter alternatively collectively referred to as processor 1804) and a memory 1806, such as random access memory (RAM). The computer 1802 may be coupled to other devices, including input/output (I/O) devices such as a keyboard 1814, a mouse device 1816 and a printer 1828.

In one embodiment, the computer 1802 operates by the general purpose processor 1804A performing instructions defined by the computer program 1810 under control of an operating system 1808. The computer program 1810 and/or the operating system 1808 may be stored in the memory 1806 and may interface with the user and/or other devices to accept input and commands and, based on such input and commands and the instructions defined by the computer program 1810 and operating system 1808 to provide output and results.

Output/results may be presented on the display 1822 or provided to another device for presentation or further processing or action. In one embodiment, the display 1822 comprises a liquid crystal display (LCD) having a plurality of separately addressable pixels formed by liquid crystals. Each pixel of the display 1822 changes to an opaque or translucent state to form a part of the image on the display in response to the data or information generated by the processor 1804 from the application of the instructions of the computer program 1810 and/or operating system 1808 to the input and commands. Other display 1822 types also include picture elements that change state in order to create the image presented on the display 1822. The image may be provided through a graphical user interface (GUI) module 1818A. Although the GUI module 1818A is depicted as a separate module, the instructions performing the GUI functions can be resident or distributed in the operating system 1808, the computer program 1810, or implemented with special purpose memory and processors.

Some or all of the operations performed by the computer 1802 according to the computer program 1810 instructions may be implemented in a special purpose processor 1804B. In this embodiment, some or all of the computer program 1810 instructions may be implemented via firmware instructions stored in a read only memory (ROM), a programmable read only memory (PROM) or flash memory within the special purpose processor 1804B or in memory 1806. The special purpose processor 1804B may also be hardwired through circuit design to perform some or all of the operations to implement the present invention. Further, the special purpose processor 1804B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1802 may also implement a compiler 1812 which allows an application program 1810 written in a programming language such as COBOL, C++, FORTRAN, or other language to be translated into processor 1804 readable code. After completion, the application or computer program 1810 accesses and manipulates data accepted from I/O devices and stored in the memory 1806 of the computer 1802 using the relationships and logic that was generated using the compiler 1812.

The computer 1802 also optionally comprises an external communication device such as a modem, satellite link, Ethernet card, or other device for accepting input from and providing output to other computers.

In one embodiment, instructions implementing the operating system 1808, the computer program 1810, and/or the compiler 1812 are tangibly embodied in a computer-readable medium, e.g., data storage device 1820, which could include one or more fixed or removable data storage devices, such as a zip drive, floppy disc drive 1824, hard drive, CD-ROM drive, tape drive, or a flash drive. Further, the operating system 1808 and the computer program 1810 are comprised of computer program instructions which, when accessed, read and executed by the computer 1802, causes the computer 1802 to perform the steps necessary to implement and/or use the present invention or to load the program of instructions into a memory, thus creating a special purpose data structure causing the computer to operate as a specially programmed computer executing the method steps described herein. Computer program 1810 and/or operating instructions may also be tangibly embodied in memory 1806 and/or data communications devices 1830, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1802.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A method of multiplexing video data having a video data bandwidth and other data, comprising:
   generating a soft upper bound for the video data bandwidth for a current schedule window $BW_{video}^{soft}(i)$, the soft upper bound for the video data bandwidth such that an average video data bandwidth over a time period T is no greater than a hard upper bound for the video data bandwidth $BW_{video}$, wherein generating the soft upper bound comprises:
   generating a required video data bandwidth $BW_{need}(i)$ for the current schedule window;
   generating an incremental change in video data bandwidth for the current schedule window $\Delta BW(i)$ wherein generating the incremental change comprises:
   generating a difference between a target video data bandwidth $BW_{video}$ and a soft upper bound for the video data bandwidth for a previous schedule window $BW_{video}^{soft}(i-1)$; and
   scaling the difference between the target video data bandwidth $BW_{video}$ and the soft upper bound for the video data bandwidth for the previous schedule window $BW_{video}^{soft}(i-1)$; and
   generating the incremental change in the video data bandwidth $\Delta BW(i)$ from an incremental change in the video data bandwidth for a previous schedule window $\Delta BW(i-1)$ and the scaled difference between the target video data bandwidth $BW_{video}$ and the soft upper bound for the video data bandwidth for the video data bandwidth for the previous schedule window $BW_{video}^{soft}(i-1)$; and generating the soft upper bound for the video data bandwidth $BW_{video}^{soft}(i)$ from the required video data bandwidth for the current schedule window $BW_{need}(i)$ and the incremental change in the video data bandwidth for the current schedule window $\Delta BW(i)$; and multiplexing the video data and the other data according to the soft upper bound for the video data bandwidth $BW_{video}^{soft}(i)$.

2. The method of claim 1, wherein generating the required video data bandwidth $BW_{need}(i)$ comprises:

generating a need parameter value for the current schedule window $NPV(i)$;

generating the required video data bandwidth $BW_{need}(i)$ from the need parameter value for the current schedule window $NPV(i)$ and a quality factor $\alpha$.

3. The method of claim 2, wherein generating the required video data bandwidth $BW_{need}(i)$ from the need parameter value for the current schedule window $NPV(i)$ and a quality factor $\propto$ comprises:

computing a normalizing function of the need parameter value for the current schedule window $f(NPV(i))$; and generating the required video data bandwidth $BW_{need}(i)$ from the computed normalizing function of the need parameter value for the current schedule window $f(NPV(i))$ and the quality factor $\alpha$.

4. The method of claim 3, wherein the need parameter value for the current schedule window $NPV(i)$ is computed at least in part according to at least one of:

video complexity;

a target device profile; and service priority level.

5. The method of claim 4, wherein scaling the difference between the target video data bandwidth $BW_{video}$ and the soft upper bound for the video data bandwidth for the previous schedule window $BW_{video}^{soft}(i-1)$ comprises:

loop filtering the difference between the target video data bandwidth $BW_{video}$ and the soft upper bound for the video data bandwidth for the previous schedule window $BW_{video}^{soft}(i-1)$; and modulating the loop filtered difference between the target video data bandwidth $BW_{video}$ and the soft upper bound for the video data bandwidth for the previous schedule window $BW_{video}^{soft}(i-1)$.

6. The method of claim 2, further comprising computing a schedule window quality factor $\propto_i$ from the generated soft upper bound for the video data bandwidth for the current schedule window $BW_{video}^{soft}(i)$ and the need parameter value for the current schedule window $NPV(i)$.

7. The method of claim 6, wherein the schedule window quality factor $\propto_i$ is computed as $$\frac{BW_{video}^{soft}(i)}{NPV(i)}.$$

8. An apparatus for multiplexing video data having a video data bandwidth and other data, comprising:

a processor;

a memory, communicatively coupled to the processor, the memory storing processor instructions comprising instructions for:

generating a soft upper bound for the video data bandwidth for a current schedule window $BW_{video}^{soft}(i)$, the soft upper bound for the video data bandwidth such that an average video data bandwidth over a time period T is no greater than a hard upper bound for the video data bandwidth $BW_{video}$, wherein the instructions for generating the soft upper bound comprise instructions for:

generating a required video data bandwidth $BW_{need}(i)$ for the current schedule window;

generating an incremental change in video data bandwidth for the current schedule window $\Delta BW(i)$, wherein the instructions for generating the incremental change in the video data bandwidth comprise instructions for:

generating a difference between a target video data bandwidth $BW_{video}$ and a soft upper bound for the video data bandwidth for a previous schedule window $BW_{video}^{soft}(i-1)$; and scaling the difference between the target video data bandwidth $BW_{video}$ and the soft upper bound for the video data bandwidth for the previous schedule window $BW_{video}^{soft}(i-1)$; and generating the incremental change in the video data bandwidth $\Delta BW(i)$ from an incremental change in the video data bandwidth for a previous schedule window $\Delta BW(i-1)$ and the scaled difference between the target video data bandwidth $BW_{video}$ and the soft upper bound for the video data bandwidth for the video data bandwidth for the previous schedule window $BW_{video}^{soft}(i-1)$;

generating the soft upper bound for the video data bandwidth $BW_{video}^{soft}(i)$ from the required video data bandwidth for the current schedule window $BW_{need}(i)$ and the incremental change in the video data bandwidth for the current schedule window; and multiplexing the video data and the other data according to the soft upper bound for the video data bandwidth $BW_{video}^{soft}(i)$.

9. The apparatus of claim 8, wherein the instructions for generating the required video data bandwidth $BW_{need}(i)$ comprise instructions for:

generating a need parameter value for the current schedule window $NPV(i)$;

generating the required video data bandwidth $BW_{need}(i)$ from the need parameter value for the current schedule window $NPV(i)$ and a quality factor $\alpha$.

10. The apparatus of claim 9, wherein the instructions for generating the required video data bandwidth $BW_{need}(i)$ from the need parameter value for the current schedule window $NPV(i)$ and a quality factor $\alpha$ comprise instructions for:

computing a normalizing function of the need parameter value for the current schedule window $f(NPV(i))$; and generating the required video data bandwidth $BW_{need}(i)$ from the computed normalizing function of the need parameter value for the current schedule window $f(NPV(i))$ and the quality factor $\alpha$.

11. The apparatus of claim 10, wherein the need parameter value for the current schedule window $NPV(i)$ is computed at least in part according to at least one of:

video complexity;

a target device profile; and service priority level.

12. The apparatus of claim 11, wherein the instructions for scaling the difference between the target video data bandwidth $BW_{video}$ the soft upper bound for the video data bandwidth for the previous schedule window $BW_{video}^{soft}(i-1)$ comprise instructions for:

loop filtering the difference between the target video data bandwidth $BW_{video}$ and the soft upper bound for the video data bandwidth for the previous schedule window $BW_{video}^{soft}(i-1)$; and modulating the loop filtered difference between the target video data bandwidth $BW_{video}$ and the soft upper bound for the video data bandwidth for the previous schedule window $BW_{video}^{soft}(i-1)$.

13. The apparatus of claim 9, wherein the instructions further comprise instructions for computing a schedule window quality factor $\alpha_i$ from the generated soft upper bound for the video data bandwidth for the current schedule window $BW_{video}^{soft}(i)$ and the need parameter value for the current schedule window NPV(i).

14. The apparatus of claim 13, wherein the schedule window quality factor $\alpha_i$ is computed as $$\frac{BW_{video}^{soft}(i)}{NPV(i)}.$$

\* \* \* \* \*